US012787010B2

(12) United States Patent
Kim et al.

(10) Patent No.: US 12,787,010 B2
(45) Date of Patent: Nov. 3, 2026

(54) METHOD AND APPARATUS FOR UPLINK TRANSMISSION AND RECEPTION IN WIRELESS COMMUNICATION SYSTEM

(71) Applicant: LG ELECTRONICS INC., Seoul (KR)

(72) Inventors: Hyungtae Kim, Seoul (KR); Jiwon Kang, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 234 days.

(21) Appl. No.: 18/850,419

(22) PCT Filed: Apr. 26, 2023

(86) PCT No.: PCT/KR2023/005651
§ 371 (c)(1),
(2) Date: Sep. 24, 2024

(87) PCT Pub. No.: WO2023/211135
PCT Pub. Date: Nov. 2, 2023

(65) Prior Publication Data

US 2025/0220669 A1 Jul. 3, 2025

(30) Foreign Application Priority Data

Apr. 27, 2022 (KR) ........................ 10-2022-0052402

(51) Int. Cl.
*H04W 72/21* (2023.01)
*H04L 47/785* (2022.01)
*H04W 24/02* (2009.01)

(52) U.S. Cl.
CPC ........... *H04W 72/21* (2023.01); *H04L 47/786* (2013.01); *H04W 24/02* (2013.01)

(58) Field of Classification Search
CPC .... H04W 72/21; H04W 24/02; H04L 47/786; H04L 1/08; H04L 1/189; G06N 3/044; G06N 3/08; G06N 20/00; H04B 7/06968
(Continued)

(56) References Cited

U.S. PATENT DOCUMENTS

2023/0144103 A1* 5/2023 Gao et al. ............. H04W 72/20 370/329
2023/0189241 A1* 6/2023 Go ............................ H04L 1/08
(Continued)

FOREIGN PATENT DOCUMENTS

WO WO-2021107631 A1 * 6/2021 ........... H04L 1/1858
WO WO-2023080734 A1 * 5/2023 ........... H04L 5/0044

*Primary Examiner* — Mahendra R Patel
(74) *Attorney, Agent, or Firm* — BRYAN CAVE LEIGHTON PAISNER LLP

(57) ABSTRACT

Disclosed are a method and apparatus for uplink transmission and reception in a wireless communication system. The method according to an embodiment of the present disclosure may comprise the steps of: receiving, from a base station, configuration information related to uplink transmission, wherein the configuration information comprises information used to determine a mapping pattern between a plurality of TOs and a plurality of TCI states regarding the uplink transmission; and repeatedly transmitting, to the base station, the uplink transmission from the plurality of TOs on the basis of the plurality of TCI states.

10 Claims, 13 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2024/0008044 | A1* | 1/2024 | Bai et al. | H04L 5/0094 |
| 2024/0333370 | A1* | 10/2024 | Kim | H04W 76/20 |
| 2025/0056513 | A1* | 2/2025 | Kang | H04L 1/08 |

* cited by examiner

Loss function: $\underset{W,V}{\operatorname{argmin}} \| x - g(f(x)) \|^2$,
where $h = f(x) = Wx, x' = g(h) = Vh$

METHOD AND APPARATUS FOR UPLINK TRANSMISSION AND RECEPTION IN WIRELESS COMMUNICATION SYSTEM

CROSS-REFERENCE TO RELATED APPLICATIONS

This application is the National Stage filing under 35 U.S.C. 371 of International Application No. PCT/KR2023/005651, filed on Apr. 26, 2023, which claims the benefit of earlier filing date and right of priority to Korean Application No. 10-2022-0052402, filed on Apr. 27, 2022, the contents of which are all incorporated by reference herein in their entireties.

TECHNICAL FIELD

The present disclosure relates to a wireless communication system, and in more detail, relates to a method and an apparatus for repeatedly transmitting and receiving uplink transmission in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus for repeatedly transmitting and receiving uplink transmission (e.g., PUSCH (physical uplink shared channel), PUCCH (physical uplink control channel), etc.).

In addition, an additional technical object of the present disclosure is to provide a method and an apparatus for determining a beam (or a transmission configuration indication (TCI) state) for uplink transmission when uplink transmission to multiple transmission reception points (TRPs) is repeated.

The technical objects to be achieved by the present disclosure are not limited to the above-described technical objects, and other technical objects which are not described herein will be clearly understood by those skilled in the pertinent art from the following description.

A method performed by a user equipment (UE) in a wireless communication system according to an aspect of the present disclosure may include: receiving, from a base station, configuration information related to uplink transmission, wherein the configuration information includes information used to determine a mapping pattern between a plurality of transmission occasions (TOs) for the uplink transmission and a plurality of transmission configuration indication (TCI) states; and repeatedly transmitting, to the base station, the uplink transmission in the plurality of TOs based on the plurality of TCI states. The mapping pattern may be determined by the UE based on the information, and the uplink transmission in each of the plurality of TOs may be transmitted based on a TCI state determined according to the mapping pattern among the plurality of TCI states.

A method performed by a base station in a wireless communication system according to an additional aspect of the present disclosure may include: transmitting, to a user equipment (UE), configuration information related to uplink transmission, wherein the configuration information includes information used to determine a mapping pattern between a plurality of transmission occasions (TOs) for the uplink transmission and a plurality of transmission configuration indication (TCI) states; and repeatedly receiving, from the UE, the uplink transmission in the plurality of TOs based on the plurality of TCI states. The mapping pattern may be determined by the UE based on the information, and the uplink transmission in each of the plurality of TOs may be transmitted based on a TCI state determined according to the mapping pattern among the plurality of TCI states.

According to an embodiment of the present disclosure, since a beam (or TCI state) for uplink transmission to be transmitted toward multiple TRPs is determined autonomously by a UE, the uplink beam can be optimized to improve reliability of uplink transmission.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
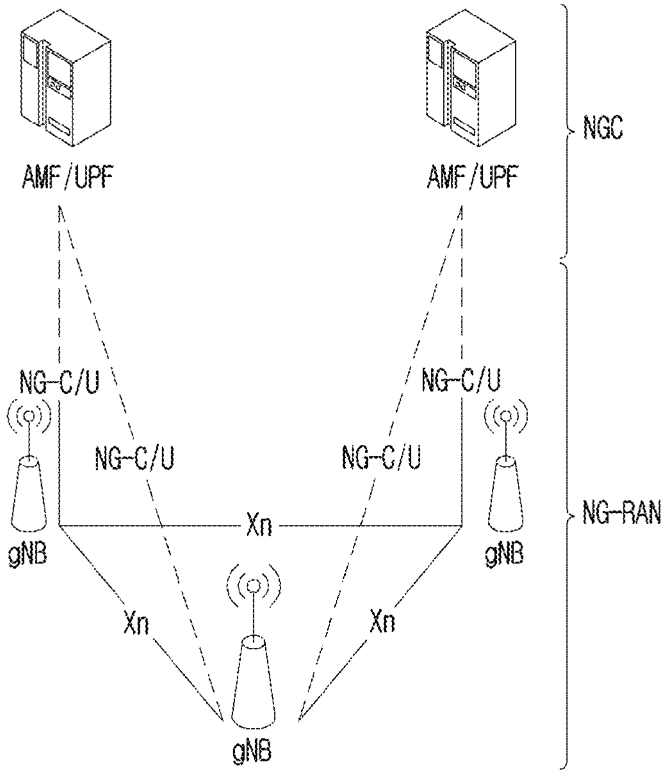
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB(evolved-NodeB), a gNB(Next Generation NodeB), a BTS(base transceiver system), an Access Point (AP), a Network (5G network), an AI (Artificial Intelligence) system/module, an RSU(road side unit), a robot, a drone(UAV: Unmanned Aerial Vehicle), an AR(Augmented Reality) device, a VR(Virtual Reality) device, etc. In addition, a terminal may be fixed or mobile, and may be substituted with a term such as a UE(User Equipment), an MS(Mobile Station), a UT(user terminal), an MSS (Mobile Subscriber Station), an SS (Subscriber Station), an AMS(Advanced Mobile Station), a WT(Wireless terminal), an MTC(Machine-Type Communication) device, an M2M(Machine-to-Machine) device, a D2D(Device-to-Device) device, a vehicle, an RSU(road side unit), a robot, an AI(Artificial Intelligence) module, a drone(UAV: Unmanned Aerial Vehicle), an AR(Augmented Reality) device, a VR(Virtual Reality) device, etc.

The following description may be used for a variety of radio access systems such as CDMA, FDMA, TDMA, OFDMA, SC-FDMA, etc. CDMA may be implemented by a wireless technology such as UTRA(Universal Terrestrial Radio Access) or CDMA2000. TDMA may be implemented by a radio technology such as GSM(Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS(Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management

CQI: Channel Quality Indicator

CRI: channel state information—reference signal resource indicator

CSI: channel state information

CSI-IM: channel state information—interference measurement

CSI-RS: channel state information—reference signal

DMRS: demodulation reference signal

FDM: frequency division multiplexing

FFT: fast Fourier transform

IFDMA: interleaved frequency division multiple access

IFFT: inverse fast Fourier transform

L1-RSRP: Layer 1 reference signal received power

L1-RSRQ: Layer 1 reference signal received quality

MAC: medium access control

NZP: non-zero power

OFDM: orthogonal frequency division multiplexing

PDCCH: physical downlink control channel

PDSCH: physical downlink shared channel

PMI: precoding matrix indicator

RE: resource element

RI: Rank indicator

RRC: radio resource control

RSSI: received signal strength indicator

Rx: Reception

QCL: quasi co-location

SINR: signal to interference and noise ratio

SSB (or SS/PBCH block): Synchronization signal block (including PSS (primary synchronization signal), SSS (secondary synchronization signal) and PBCH (physical broadcast channel))

TDM: time division multiplexing

TRP: transmission and reception point

TRS: tracking reference signal

Tx: transmission

UE: user equipment

ZP: zero power

Overall System

As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB(enhanced mobile broadband communication), mMTC(massive MTC), URLLC(Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA(NG-Radio Access) user plane (i.e., a new AS(access stratum) sublayer/PDCP(Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF(Access and Mobility Management Function) through an N2 interface, and is connected to a UPF(User Plane Function) through an N3 interface.

Figure 2:
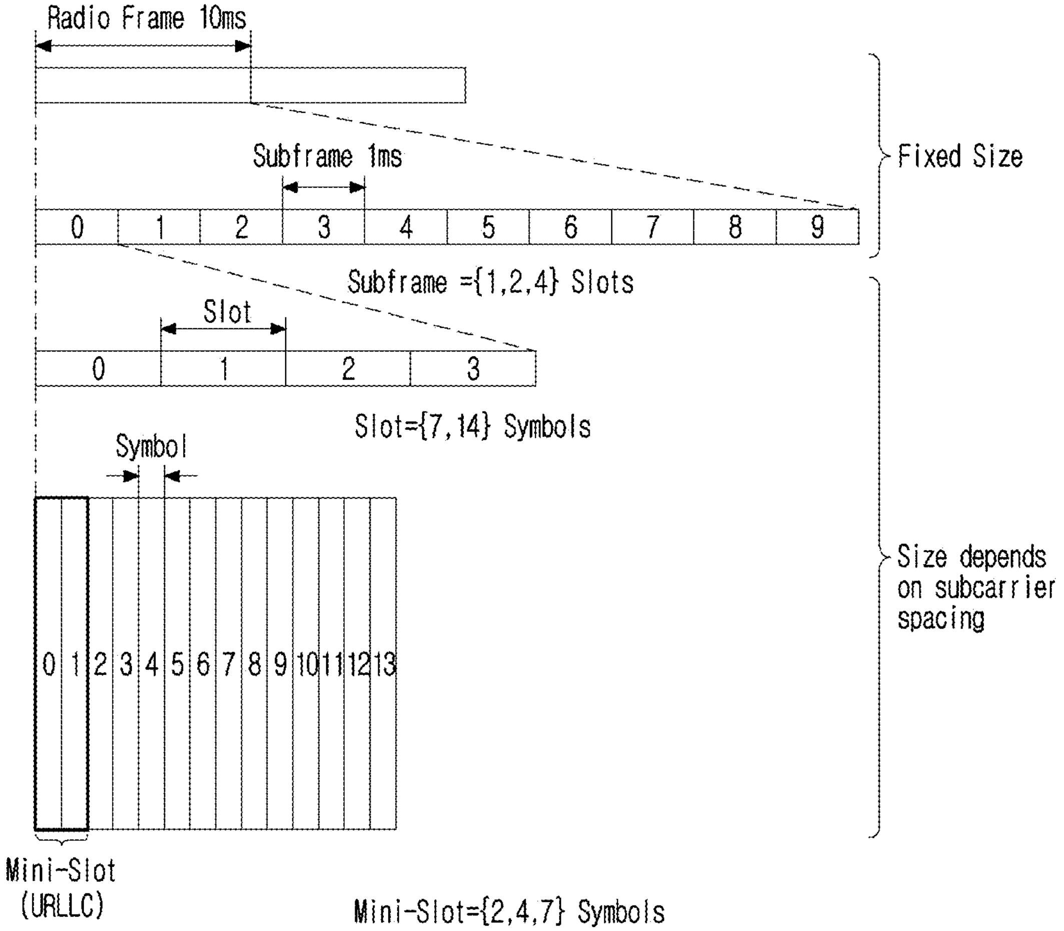
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described.

A plurality of OFDM numerologies supported in a NR system may be defined as in the following Table 1.

TABLE 1

| $\mu$ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480·103 Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset}) T_c$ than a corresponding downlink frame in a corresponding terminal starts. For a subcarrier spacing configuration $\mu$, slots are numbered in an increasing order of $n_s^{\mu} \in \{0, \ldots, N_{slot}^{subframe,\mu}-1\}$ in a subframe and are numbered in an increasing order of $n_{s,f}^{\mu} \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu} N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on $\mu=2$ (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL(quasi co-located or quasi co-location) relationship. In this case, the large-scale property includes at least one of delay spread, doppler spread, frequency shift, average received power, received timing.

Figure 3:
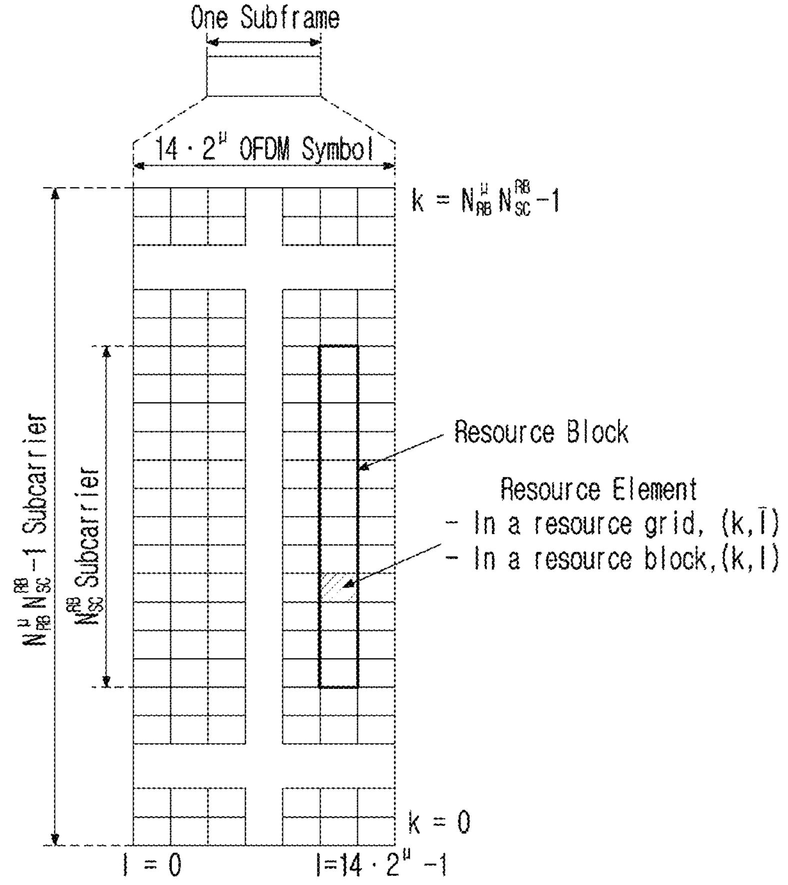
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu} N_{sc}^{RB}$ subcarriers in a frequency domain and one subframe is configured with $14 \cdot 2^{\mu}$ OFDM symbols, but it is not limited thereto. In an NR system, a transmitted signal is described by OFDM symbols of $2^{\mu} N_{symb}^{(\mu)}$ and one or more resource grids configured with $N_{RB}^{\mu} N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies. In this case, one resource grid may be configured per $\mu$ and antenna port $\mu$. Each element of a resource grid for $\mu$ and an antenna port p is referred to as a resource element and is uniquely identified by an index pair (k, l'). Here, $k=0, \ldots, N_{RB}^{\mu} N_{sc}^{RB}-1$ is an index in a frequency domain and $l'=0, \ldots, 2^{\mu} N_{symb}^{(\mu)}-1$ refers to a position of a symbol in a subframe. When referring to a resource element in a slot, an index pair (k,l) is used. Here, $l=0, \ldots, N_{symb}^{\mu}-1$. A resource element (k,l') for $\mu$ and an antenna port p corresponds to a complex value, $a_{k,l'}^{(p,\mu)}$. When there is no risk of confusion or when a specific antenna port or numerology is not specified, indexes p and $\mu$ may be dropped, whereupon a complex value may be $a_{k,l'}^{(P)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration P in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
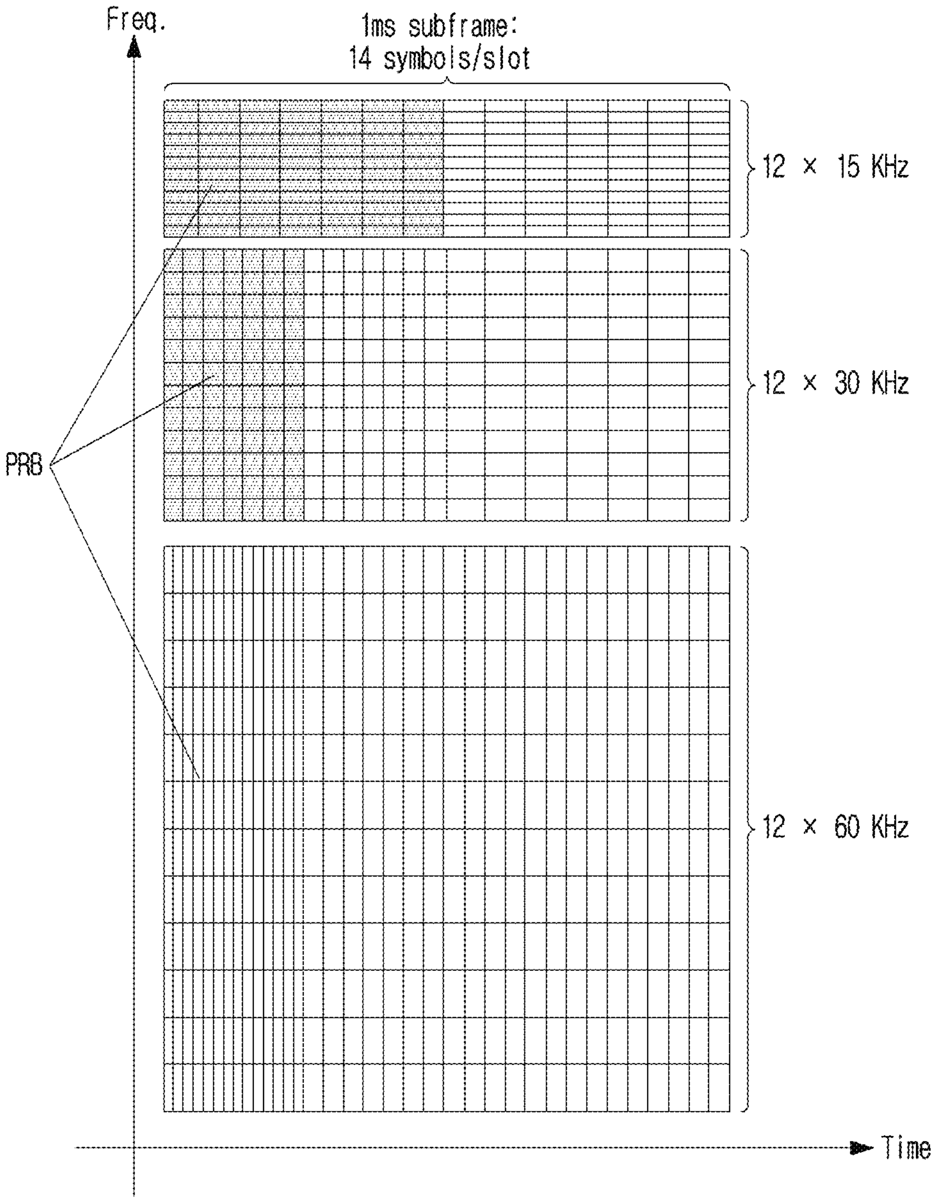
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
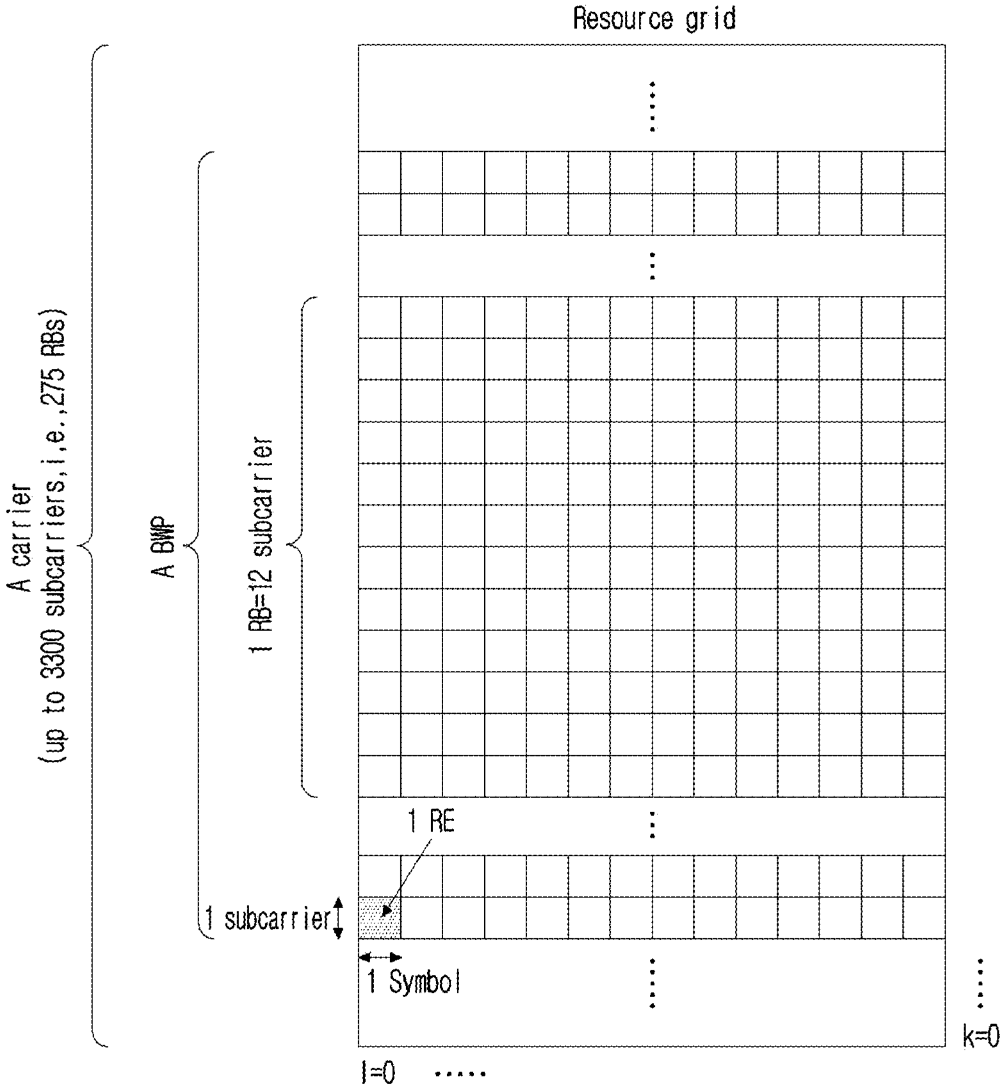
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP(Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
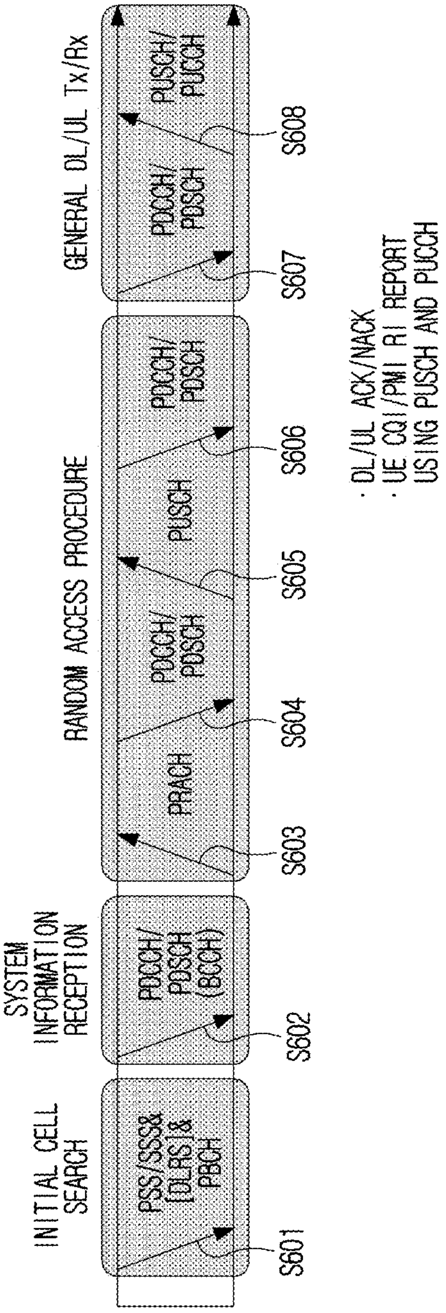
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH(Physical Uplink Shared Channel)/PUCCH(physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK(Acknowledgement/Non-Acknowledgement) signal, a CQI(Channel Quality Indicator), a PMI(Precoding Matrix Indicator), a RI(Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 01 and 0_2 may include resource information (e.g., UL/SUL(Supplementary UL), frequency resource allocation, time resource allocation, frequency hopping, etc.), information related to a transport block(TB) (e.g., MCS(Modulation Coding and Scheme), a NDI(New Data Indicator), a RV(Redundancy Version), etc.), information related to a HARQ(Hybrid—Automatic Repeat and request) (e.g., a process number, a DAI(Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI(Cell Radio Network Temporary Identifier) or a CS-RNTI(Configured Scheduling RNTI) or a MCS-C-RNTI(Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI(Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB(virtual resource block)—PRB(physical resource block) mapping, etc.), information related to a transport block(TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS(sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Artificial Intelligence (AI) Operation

With the technological advancement of artificial intelligence/machine learning (AI/ML), node(s) and UE(s) in a wireless communication network are becoming more intelligent/advanced. In particular, due to the intelligence of networks/base stations, it is expected that it will be possible to rapidly optimize and derive/apply various network/base station decision parameter values (e.g., transmission/reception power of each base station, transmission power of each UE, precoder/beam of base station/UE, time/frequency resource allocation for each UE, duplex method of each base station, etc.) according to various environmental parameters (e.g., distribution/location of base stations, distribution/location/material of buildings/furniture, etc., location/movement direction/speed of UEs, climate information, etc.). Following this trend, many standardization organizations (e.g., 3GPP, O-RAN) are considering introduction, and studies on this are also actively underway.

The AI-related descriptions and operations described below can be applied in combination with the methods proposed in the present disclosure described later, or can be supplemented to clarify the technical features of the methods proposed in the present disclosure.

Figure 7:
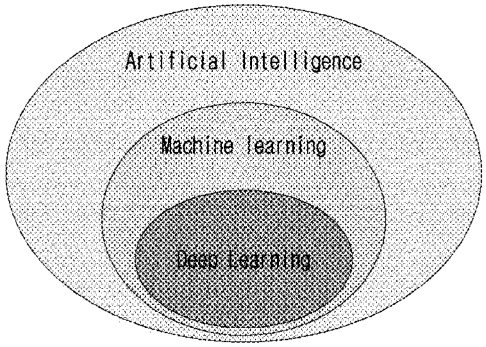
FIG. 7 illustrates a classification of artificial intelligence.

FIG. 7 illustrates a classification of artificial intelligence.

Referring to FIG. 7, artificial intelligence (AI) corresponds to all automation in which machines can replace work that should be done by humans.

Machine Learning (ML) refers to a technology in which machines learn patterns for decision-making from data on their own without explicitly programming rules.

Deep Learning is an artificial neural network-based model that allows a machine to perform feature extraction and decision from unstructured data at once. The algorithm relies on a multi-layer network of interconnected nodes for feature extraction and transformation, inspired by the biological nervous system, or Neural Network. Common deep learning network architectures include deep neural networks (DNNs), recurrent neural networks (RNNs), and convolutional neural networks (CNNs).

AI (or referred to as AI/ML) can be narrowly referred to as artificial intelligence based on deep learning, but is not limited to this in the present disclosure. That is, in the present disclosure, AI (or AI/ML) may collectively refer to automation technologies applied to intelligent machines (e.g., UE, RAN, network nodes, etc.) that can perform tasks like humans.

AI (or AI/ML) can be classified according to various criteria as follows.

1. Offline/Online Learning a) Offline Learning

Offline learning follows a sequential procedure of database collection, learning, and prediction. In other words, collection and learning can be performed offline, and the completed program can be installed in the field and used for prediction work. For offline learning, the system does not learn incrementally, the learning is performed using all available collected data and applied to the system without further learning. If learning about new data is necessary, learning can begin again using all new data.

b) Online Learning

This refers to a method of gradually improving performance by incrementally additional learning with data generated in real time, recently, by taking advantage of the fact that data that can be used for learning continues to be generated through the Internet, Learning is performed in real time for each (bundle) of specific data collected online, allowing the system to quickly adapt to changing data.

Only online learning is used to build an AI system, so learning may be performed only with data generated in real time, or after offline learning is performed using a predetermined data set, additional learning may be performed using additional real-time data (online+offline learning).

2. Classification According to AI/ML Framework Concept a) Centralized Learning

In centralized learning, training data collected from a plurality of different nodes is reported to a centralized node, all data resources/storage/learning (e.g., supervised learning, unsupervised learning, reinforcement learning, etc.) are performed in one centralized node.

b) Federated Learning

Federated learning is a collective model built on data that exists across distributed data owners. Instead of collecting data into a model, AI/ML models are imported into a data source, allowing local nodes/individual devices to collect data and train their own copies of the model, eliminating the need to report the source data to a central node. In federated learning, the parameters/weights of an AI/ML model can be sent back to the centralized node to support general model training. Federated learning has advantages in terms of increased computation speed and information security. In other words, the process of uploading personal data to the central server is unnecessary, preventing leakage and misuse of personal information.

c) Distributed Learning

Distributed learning refers to the concept in which machine learning processes are scaled and distributed across a cluster of nodes. Training models are split and shared across multiple nodes operating simultaneously to speed up model training.

3. Classification According to Learning Method a) Supervised Learning

Supervised learning is a machine learning task that aims to learn a mapping function from input to output, given a labeled data set. The input data is called training data and has known labels or results. An example of supervised learning is as follows.

- Regression: Linear Regression, Logistic Regression
- Instance-based Algorithms: k-Nearest Neighbor (KNN)
- Decision Tree Algorithms: Classification and Regression Tree (CART)
- Support Vector Machines (SVM)
- Bayesian Algorithms: Naive Bayes
- Ensemble Algorithms: Extreme Gradient Boosting, Bagging: Random Forest Supervised learning can be further grouped into regression and classification problems, where classification is predicting a label and regression is predicting a quantity.

b) Unsupervised Learning

Unsupervised learning is a machine learning task that aims to learn features that describe hidden structures in unlabeled data. The input data is not labeled and there are no known results. Some examples of unsupervised learning include K-means clustering, Principal Component Analysis (PCA), nonlinear Independent Component Analysis (ICA), and Long-Short-Term Memory (LSTM).

c) Reinforcement Learning (RL)

In reinforcement learning (RL), the agent aims to optimize long-term goals by interacting with the environment based on a trial and error process, and is goal-oriented learning based on interaction with the environment. An example of the RL algorithm is as follows.

- Q-learning
- Multi-armed bandit learning
- Deep Q Network
- State-Action-Reward-State-Action (SARSA)
- Temporal Difference Learning
- Actor-critic reinforcement learning
- Deep deterministic policy gradient (DDPG)
- Monte-Carlo tree search Additionally, reinforcement learning can be grouped into model-based reinforcement learning and model-free reinforcement learning as follows.

- Model-based reinforcement learning: refers to RL algorithm that uses a prediction model. Using a model of the various dynamic states of the environment and which states lead to rewards, the probabilities of transitions between states are obtained.
- Model-free reinforcement learning: refers to RL algorithm based on value or policy that achieves the maximum future reward. Multi-agent environments/states are computationally less complex and do not require an accurate representation of the environment.

Additionally, RL algorithm can also be classified into value-based RL vs. policy-based RL, policy-based RL vs. non-policy RL, etc.

Hereinafter, representative models of deep learning will be exemplified.

Figure 8:
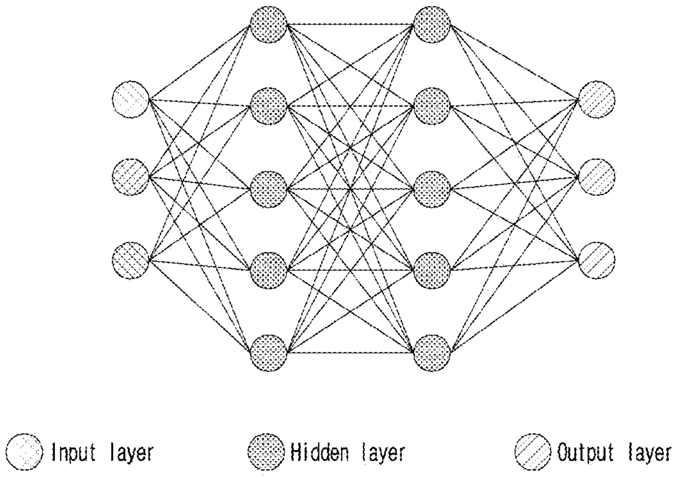
FIG. 8 illustrates a feed-forward neural network.

FIG. 8 illustrates a feed-forward neural network.

A feed-forward neural network (FFNN) is composed of an input layer, a hidden layer, and an output layer.

In FFNN, information is transmitted only from the input layer to the output layer, and if there is a hidden layer, it passes through it.

Figure 9:
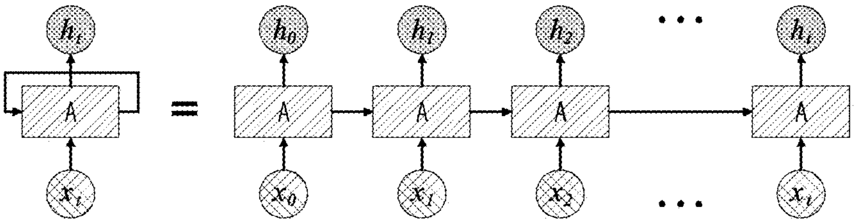
FIG. 9 illustrates a recurrent neural network.

FIG. 9 illustrates a recurrent neural network.

A recurrent neural network (RNN) is a type of artificial neural network in which hidden nodes are connected to directed edges to form a directed cycle. This model is suitable for processing data that appears sequentially, such as voice and text.

In FIG. 9, A represents a neural network, xt represents an input value, and ht represents an output value. Here, ht may refer to a state value representing the current state based on time, and ht−1 may represent a previous state value.

One type of RNN is LSTM (Long Short-Term Memory), which has a structure that adds a cell-state to the hidden state of the RNN. LSTM can erase unnecessary memories by adding an input gate, forgetting gate, and output gate to the RNN cell (memory cell of the hidden layer). LSTM adds cell state compared to RNN.

Figure 10:
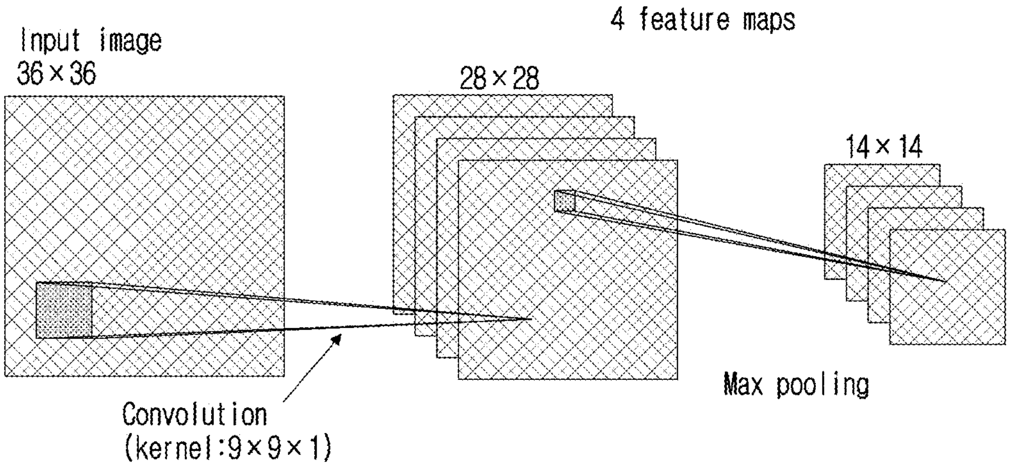
FIG. 10 illustrates a convolutional neural network.

FIG. 10 illustrates a convolutional neural network.

Convolutional neural network (CNN) is used for two purposes: reducing model complexity and extracting good features by applying convolution operations commonly used in the image processing or image processing fields.

- Kernel or filter: refers to a unit/structure that applies weight to input of a specific range/unit. The kernel (or filter) can be changed through learning.
- Stride: refers to the movement range of moving the kernel within the input.
- Feature map: refers to the result of applying the kernel to input. Several feature maps can be extracted to ensure robustness to distortion, change, etc.
- Padding: refers to a value added to adjust the size of the feature map.
- Pooling: refers to an operation (e.g., max pooling, average pooling) to reduce the size of the feature map by downsampling the feature map.

Figure 11:
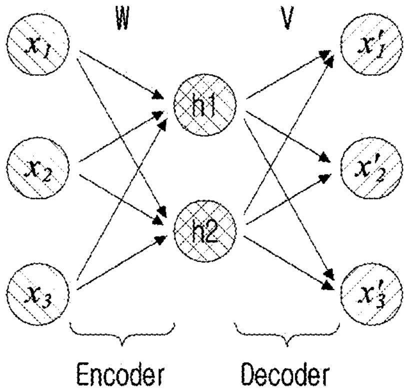
FIG. 11 illustrates an auto encoder.

FIG. 11 illustrates an auto encoder.

Auto encoder refers to a neural network that receives a feature vector x (x1, x2, x3, . . . ) as input and outputs the same or similar vector x' (x'1, x'2, x'3, . . . )'.

Auto encoder has the same characteristics as the input node and output node. Since the auto encoder reconstructs the input, the output can be referred to as reconstruction. Additionally, auto encoder is a type of unsupervised learning.

The loss function of the auto encoder illustrated in FIG. 11 is calculated based on the difference between input and output, and based on this, the degree of input loss is identified and an optimization process is performed in the auto encoder to minimize the loss.

Hereinafter, for a more specific explanation of AI (or AI/ML), terms can be defined as follows.

- Data collection: Data collected from the network nodes, management entity or UE, as a basis for AI model training, data analytics and inference.
- AI Model: A data driven algorithm by applying AI techniques that generates a set of outputs consisting of predicted information and/or decision parameters, based on a set of inputs.

AI/ML Training: An online or offline process to train an AI model by learning features and patterns that best present data and get the trained AI/ML model for inference.

AI/ML Inference: A process of using a trained AI/ML model to make a prediction or guide the decision based on collected data and AI/ML model.

Figure 12:
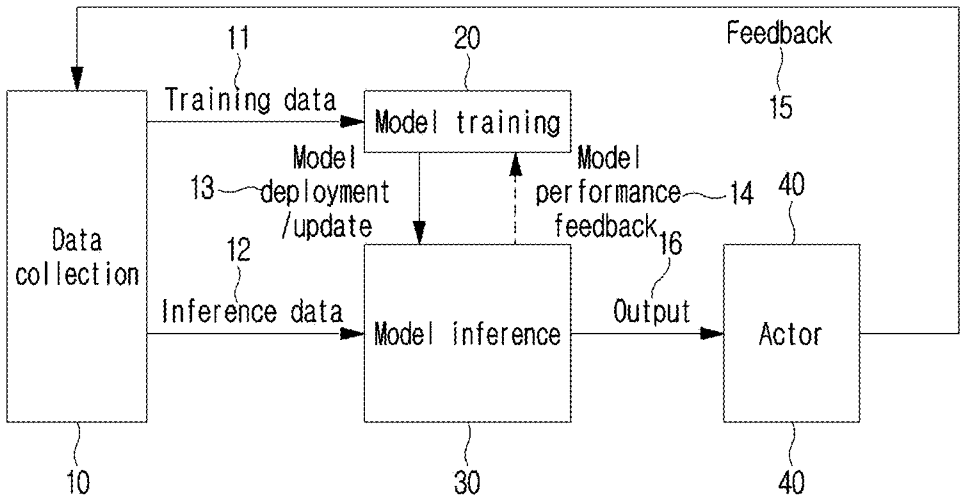
FIG. 12 illustrates a functional framework for an AI operation.

FIG. 12 illustrates a functional framework for an AI operation.

Referring to FIG. 12, the data collection function (10) is a function that collects input data and provides processed input data to the model training function (20) and the model inference function (30).

Examples of input data may include measurements from UEs or different network entities, feedback from Actor, output from an AI model.

The Data Collection function (10) performs data preparation based on input data and provides input data processed through data preparation. Here, the Data Collection function (10) does not perform specific data preparation (e.g., data pre-processing and cleaning, formatting and transformation) for each AI algorithm, and data preparation common to AI algorithms can be performed.

After performing the data preparation process, the Model Training function (10) provides Training Data (11) to the Model Training function (20) and provides Inference Data (12) to the Model Inference function (30). Here, Training Data (11) is data required as input for the AI Model Training function (20). Inference Data (12) is data required as input for the AI Model Inference function (30).

The Data Collection function (10) may be performed by a single entity (e.g., UE, RAN node, network node, etc.), but may also be performed by a plurality of entities. In this case, Training Data (11) and Inference Data (12) can be provided from a plurality of entities to the Model Training function (20) and the Model Inference function (30), respectively.

Model Training function (20) is a function that performs the AI model training, validation, and testing which may generate model performance metrics as part of the model testing procedure. The Model Training function (20) is also responsible for data preparation (e.g., data pre-processing and cleaning, formatting, and transformation) based on Training Data (11) delivered by a Data Collection function (10), if required.

Here, Model Deployment/Update (13) is used to initially deploy a trained, validated, and tested AI model to the Model Inference function (30) or to deliver an updated model to the Model Inference function (30).

Model Inference function (30) is a function that provides AI model inference output (16) (e.g., predictions or decisions). Model Inference function (30) may provide Model Performance Feedback (14) to Model Training function (20) when applicable. The Model Inference function (30) is also responsible for data preparation (e.g., data pre-processing and cleaning, formatting, and transformation) based on Inference Data (12) delivered by a Data Collection function (10), if required.

Here, Output (16) refers to the inference output of the AI model produced by a Model Inference function (30), and details of inference output may be use case specific.

Model Performance Feedback (14) may be used for monitoring the performance of the AI model, when available, and this feedback may be omitted.

Actor function (40) is a function that receives the Output (16) from the Model Inference function (30) and triggers or performs corresponding actions. The Actor function (40) may trigger actions directed to other entities (e.g., one or more UEs, one or more RAN nodes, one or more network nodes, etc) or to itself.

Feedback (15) may be used to derive Training data (11), Inference data (12) or to monitor the performance of the AI Model and its impact to the network, etc.

Meanwhile, the definitions of training/validation/test in the data set used in AI/ML can be divided as follows.

Training data: refers to a data set for learning a model.

Validation data: This refers to a data set for verifying a model for which learning has already been completed. In other words, it usually refers to a data set used to prevent over-fitting of the training data set.

It also refers to a data set for selecting the best among various models learned during the learning process. Therefore, it can also be considered as a type of learning.

Test data: refers to a data set for final evaluation. This data is unrelated to learning.

In the case of the data set, if the training set is generally divided, within the entire training set, training data and validation data can be divided into 8:2 or 7:3, and if testing is included, 6:2:2 (training: validation: test) can be used.

Depending on the capability of the AI/ML function between a base station and a UE, a cooperation level can be defined as follows, and modifications can be made by combining the following multiple levels or separating any one level.

Cat 0a) No collaboration framework: AI/ML algorithm is purely implementation-based and do not require any air interface changes.

Cat 0b) This level corresponds to a framework without cooperation but with a modified air interface tailored to efficient implementation-based AI/ML algorithm.

Cat 1) This involves inter-node support to improve the AI/ML algorithm of each node. This applies if a UE receives support from a gNB (for training, adaptation, etc.) and vice versa. At this level, model exchange between network nodes is not required.

Cat 2) Joint ML tasks between a UE and a gNB may be performed. This level requires AI/ML model command and an exchange between network nodes.

The functions previously illustrated in FIG. 12 may be implemented in a RAN node (e.g., base station, TRP, base station central unit (CU), etc.), a network node, a network operator's operation administration maintenance (OAM), or a UE.

Alternatively, the function illustrated in FIG. 12 may be implemented through cooperation of two or more entities among a RAN, a network node, an OAM of network operator, or a UE. For example, one entity may perform some of the functions of FIG. 12 and other entities may perform the remaining functions. As such, as some of the functions illustrated in FIG. 12 are performed by a single entity (e.g., UE, RAN node, network node, etc.), transmission/provision of data/information between each function may be omitted. For example, if the Model Training function (20) and the Model Inference function (30) are performed by the same entity, the delivery/provision of Model Deployment/Update (13) and Model Performance Feedback (14) can be omitted.

Alternatively, any one of the functions illustrated in FIG. 12 may be performed through collaboration between two or more entities among a RAN, a network node, an OAM of a network operator, or a UE. This can be referred to as a split AI operation.

Figure 13:
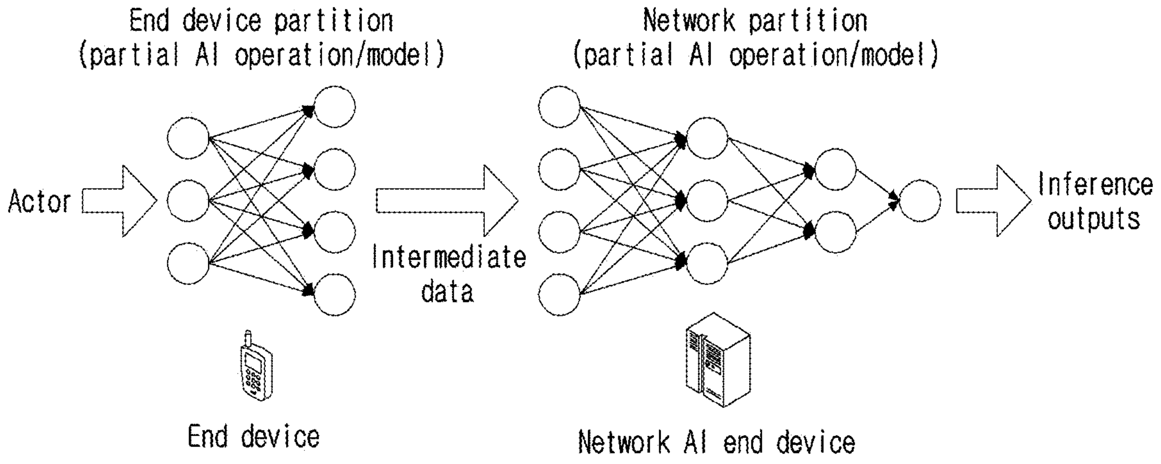
FIG. 13 is a diagram illustrating split AI inference.

FIG. 13 is a diagram illustrating split AI inference.

FIG. 13 illustrates a case in which, among split AI operations, the Model Inference function is performed in cooperation with an end device such as a UE and a network AI/ML endpoint.

In addition to the Model Inference function, the Model Training function, the Actor, and the Data Collection function are respectively split into multiple parts depending on the current task and environment, and can be performed by multiple entities collaborating.

For example, computation-intensive and energy-intensive parts may be performed at a network endpoint, while parts sensitive to personal information and delay-sensitive parts may be performed at an end device. In this case, an end device can execute a task/model from input data to a specific part/layer and then transmit intermediate data to a network endpoint. A network endpoint executes the remaining parts/layers and provides inference outputs to one or more devices that perform an action/task.

Figure 14:
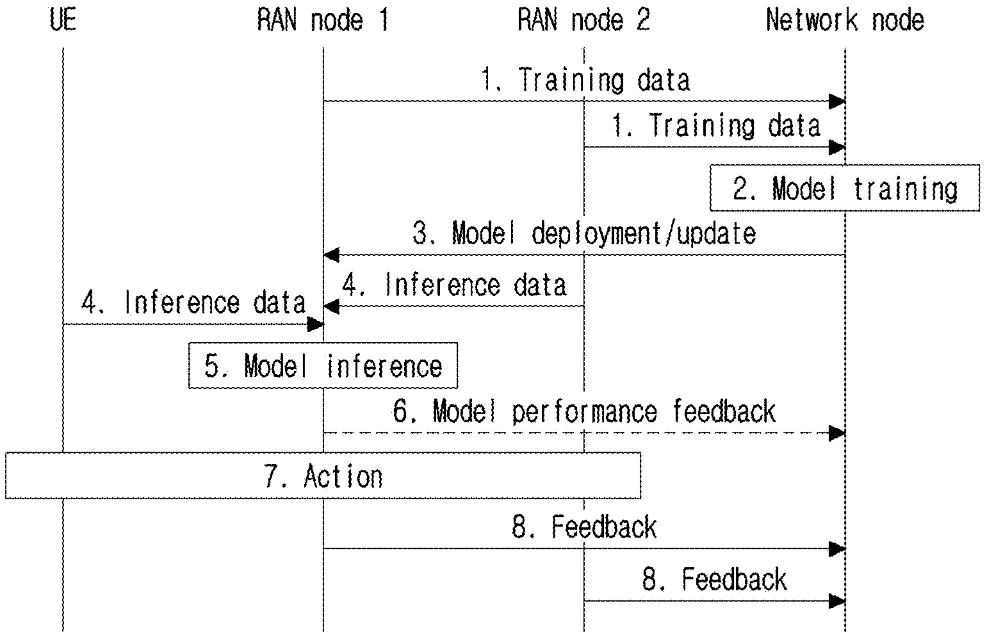
FIG. 14 illustrates an application of a functional framework in a wireless communication system.

FIG. 14 illustrates an application of a functional framework in a wireless communication system.

FIG. 14 illustrates a case where the AI Model Training function is performed by a network node (e.g., core network node, network operator's OAM, etc.) and the AI Model Inference function is performed by a RAN node (e.g., base station, TRP, CU of base station, etc.).

Step 1: RAN Node 1 and RAN Node 2 transmit input data (i.e., Training data) for AI Model Training to the network node. Here, RAN Node 1 and RAN Node 2 may transmit the data collected from the UE (e.g., UE measurements related to RSRP, RSRQ, SINR of the serving cell and neighboring cells, UE location, speed, etc.) to the network node.

Step 2: The network node trains the AI Model using the received training data.

Step 3: The network node distributes/updates the AI Model to RAN Node 1 and/or RAN Node 2. RAN Node 1 (and/or RAN Node 2) may continue to perform model training based on the received AI Model.

For convenience of explanation, it is assumed that the AI Model has been distributed/updated only to RAN Node 1.

Step 4: RAN Node 1 receives input data (i.e., Inference data) for AI Model Inference from the UE and RAN Node 2.

Step 5: RAN Node 1 performs AI Model Inference using the received Inference data to generate output data (e.g., prediction or decision).

Step 6: If applicable, RAN Node 1 may send model performance feedback to the network node.

Step 7: RAN Node 1, RAN Node 2, and UE (or 'RAN Node 1 and UE', or 'RAN Node 1 and RAN Node 2') perform an action based on the output data. For example, in the case of load balancing operation, the UE may move from RAN node 1 to RAN node 2.

Step 8: RAN Node 1 and RAN Node 2 transmit feedback information to the network node.

Figure 15:
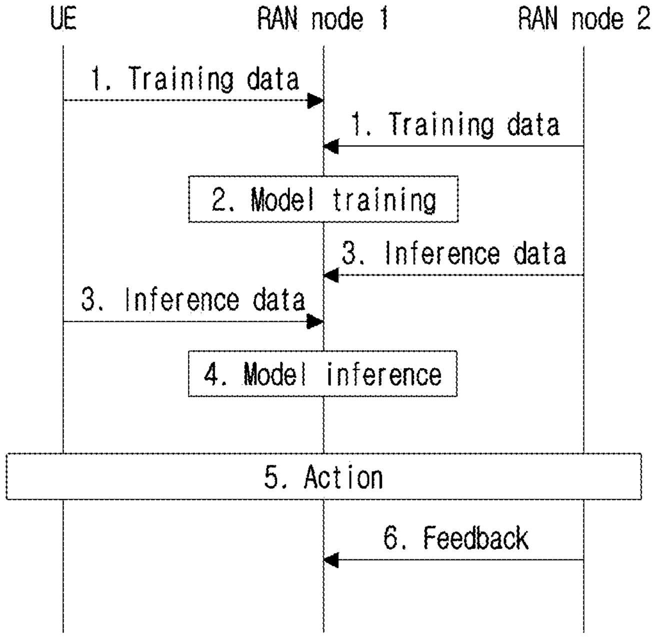
FIG. 15 illustrates an application of a functional framework in a wireless communication system.

FIG. 15 illustrates an application of a functional framework in a wireless communication system.

FIG. 15 illustrates a case where both the AI Model Training function and the AI Model Inference function are performed by a RAN node (e.g., base station, TRP, CU of the base station, etc.).

Step 1: The UE and RAN Node 2 transmit input data (i.e., Training data) for AI Model Training to RAN Node 1.

Step 2: RAN Node 1 trains the AI Model using the received training data.

Step 3: RAN Node 1 receives input data (i.e., Inference data) for AI Model Inference from the UE and RAN Node 2.

Step 4: RAN Node 1 performs AI Model Inference using the received Inference data to generate output data (e.g., prediction or decision).

Step 5: RAN Node 1, RAN Node 2, and the UE (or 'RAN Node 1 and UE', or 'RAN Node 1 and RAN Node 2') perform an action based on the output data. For example, in the case of load balancing operation, the UE may move from RAN node 1 to RAN node 2.

Step 6: RAN node 2 transmits feedback information to RAN node 1.

Figure 16:
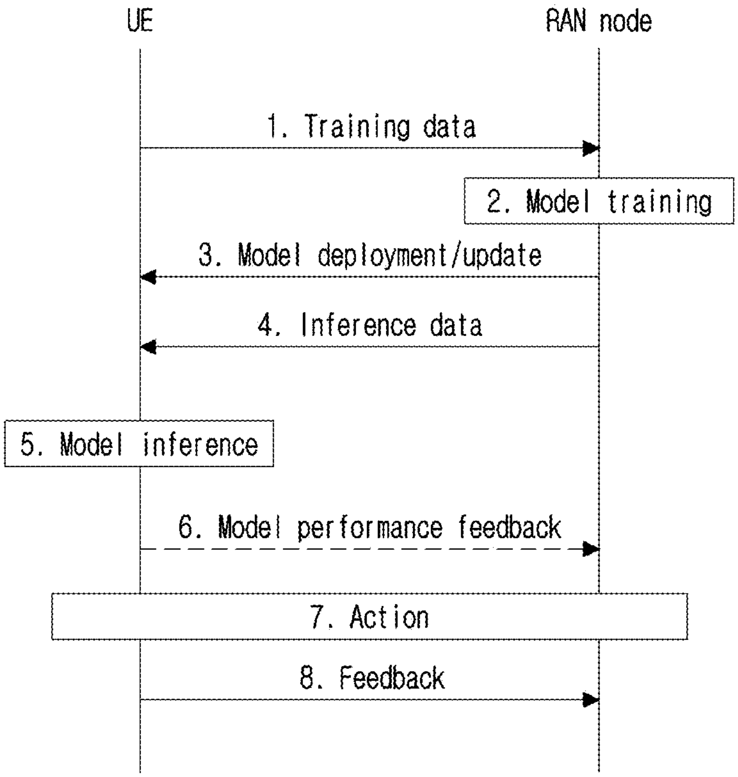
FIG. 16 illustrates an application of a functional framework in a wireless communication system.

FIG. 16 illustrates an application of a functional framework in a wireless communication system.

FIG. 16 illustrates a case where the AI Model Training function is performed by a RAN node (e.g., base station, TRP, CU of the base station, etc.), and the AI Model Inference function is performed by the UE.

Step 1: The UE transmits input data (i.e., Training data) for AI Model Training to the RAN node. Here, the RAN node may collect data (e.g., measurements of the UE related to RSRP, RSRQ, SINR of the serving cell and neighboring cells, location of the UE, speed, etc.) from various UEs and/or from other RAN nodes.

Step 2: The RAN node trains the AI Model using the received training data.

Step 3: The RAN node distributes/updates the AI Model to the UE. The UE may continue to perform model training based on the received AI Model.

Step 4: The UE receives input data (i.e., Inference data) for AI Model Inference from the RAN node (and/or from other UEs).

Step 5: The UE performs AI Model Inference using the received Inference data to generate output data (e.g., prediction or decision).

Step 6: If applicable, the UE may transmit model performance feedback to the RAN node.

Step 7: The UE and the RAN node perform an action based on output data.

Step 8: The UE transmits feedback information to the RAN node.

Quasi-Co Location (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL(quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A quasi co-location type corresponding to each DL RS is given by a higher layer parameter qcl-Type of QCL-Info and may take one of the following values.

- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

For example, when a target antenna port is a specific NZP CSI-RS, it may be indicated/configured that a corresponding NZP CSI-RS antenna port(s) is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission(JT), coordinated Scheduling(CS), coordinated Beamforming (CB), dynamic Point Selection(DPS), dynamic Point Blocking(DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI(multiple DCI) that each TRP transmits different DCIs and ii) M-TRP transmission based on S-DCI(single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

A UE may recognize PUSCH (or PUCCH) scheduled by DCI received in different control resource sets(CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N(ACK/NACK), SR(scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N(process/retransmission) for PDSCH/PUSCH, etc. scheduled per each TRP/panel may be managed per corresponding CORESET group (i.e., per TRP/panel belonging to the same CORESET group).

For example, a higher layer parameter, ControlResourceSet information element (IE), is used to configure a time/frequency control resource set (CORESET). In an example, the control resource set (CORESET) may be related to detection and reception of downlink control information. The ControlResourceSet IE may include a CORESET-related ID (e.g., controlResourceSetID)/an index of a CORESET pool for a CORESET (e.g., CORESETPoolIndex)/a time/frequency resource configuration of a CORESET/TCI information related to a CORESET, etc. In an example, an index of a CORESET pool (e.g., CORESETPoolIndex) may be configured as 0 or 1. In the description, a CORESET group may correspond to a CORESET pool and a CORESET group ID may correspond to a CORESET pool index (e.g., CORESETPoolIndex).

The Rel-17 NR standard supports (1) MTRP PDCCH repeat transmission, (2) MTRP PDCCH single frequency network (SFN) transmission, (3) MTRP PDSCH SFN transmission, (4) MTRP PUSCH repeat transmission based on S-DCI, and (4) MTRP PUCCH repeat transmission based on single PUCCH resource. All of these transmission techniques are URLLC target enhancements for increasing reliability, and the same contents (i.e., DCI or UL/DL TB or UCI) are repeatedly transmitted. In the case of MTRP PDCCH repeat transmission, it is repeatedly transmitted in TDM or FDM, MTRP PDCCH/PDSCH SFN is repeatedly transmitted at the same time/frequency/layer, S-DCI-based MTRP PUSCH repeat transmission is repeatedly transmitted in TDM, and single PUCCH resource-based MTRP PUCCH repeat transmission is repeatedly transmitted in TDM.

(1) MTRP PDCCH Repeat Transmission

For MTRP PDCCH repeat transmission, multiple CORESETs with different TCI states (i.e., different QCL RSs) are configured to a UE, and multiple SS sets each connected/associated to the corresponding CORESETs are configured to the UE. A base station indicates/configures a UE that a search space set (SS set) associated to one CORESET and an SS set associated to another CORESET are linked for repeat transmission, so that the UE can know that PDCCH candidates of the corresponding SS set are repeatedly transmitted.

For example, it is assumed that two CORESETs, CORESET 0 and 1, are configured to a UE, and CORESET 0 and 1 are associated to SS set 0 and 1, respectively, and that SS set 0 and 1 are linked. The UE can recognize that a PDCCH candidate of SS set 0 and a PDCCH candidate of SS set 1 are repeatedly transmitting the same DCI, and through a specific rule, and the UE can recognize that a specific PDCCH candidate of SS set 0 and a specific PDCCH candidate of SS set 1 are a pair established for repeatedly transmitting the same DCI. These two PDCCH candidates are referred to as linked PDCCH candidates, and a UE can successfully decode the corresponding DCI if it correctly receives either of the two PDCCH candidates. However, when receiving the PDCCH candidate of SS set 0, a QCL RS (i.e., DL beam) of a TCI state of COERSET 0 associated to SS set 0 is used, and when receiving the PDCCH candidate of SS set 1, a QCL RS (i.e., DL beam) of a TCI state of COERSET 1 associated to SS set 1 is used, thereby receiving the linked PDCCH candidates with different beams.

(2) MTRP SFN PDCCH Repeat Transmission

As a special case of MTRP PDCCH repeat transmission, multiple TRPs can repeatedly transmit the same DCI through the same time/frequency/DMRS port, which can be referred to as SFN PDCCH transmission. However, for SFN PDCCH transmission, instead of configuring multiple CORESETs with different TCI states to a UE, a base station sets multiple TCI states to one CORESET. When a UE receives a PDCCH candidate through a SS set associated to one CORESET, it performs channel estimation of a PDCCH DMRS using all of the multiple TCI states and attempts to decode.

(3) MTRP SFN PDSCH Repeat Transmission

When the MTRP PDSCH is repeatedly transmitted, two TRPs repeatedly transmit a corresponding PDSCH on different resources. However, as a special case, if a resource used by two TRPs are the same, that is, if the same channel is repeatedly transmitted through the same frequency, time, and layer (i.e., DMRS port), the reliability of the corresponding channel can be improved. In this case, the same channel that is repeatedly transmitted is received by combining it in the air because the resources are not distinguished, so it is recognized as one channel from the receiver's perspective. For PDSCH SFN transmission, two DL TCI states for PDSCH DMRS reception can be configured.

(4) S-DCI Based MTRP PUSCH Repeat Transmission

For S-DCI based MTRP PUSCH transmission, a base station configured two SRS sets to the UE, where each set is used to indicate a UL Tx port and UL beam/QCL information toward TRP 1 and TRP 2, respectively. In addition, a base station performs SRS resource indication for each SRS set through two SRI fields in one DCI, and can indicate up to two power control (PC) parameter sets. For example, the first SRI field can indicate an SRS resource and a PC parameter set defined in SRS set 0, and the second SRI field can indicate an SRS resource and a PC parameter set defined in SRS set 1. A UE is indicated with UL Tx port, PC parameter set, and UL beam/QCL information toward TRP 1 through the first SRI field, and performs PUSCH transmission at the transmission occasion (TO) corresponding to SRS set 0 through these. Similarly, a UE is indicated with UL Tx port, PC parameter set, and UL beam/QCL information toward TRP 2 through the second SRI field, and performs PUSCH transmission in the TO corresponding to SRS set 1. Similarly, a UE is instructed with the UL Tx port, PC parameter set, and UL beam/QCL information toward TRP 2 through the second SRI field, and performs PUSCH transmission in the TO corresponding to SRS set 1. Here, the TO corresponding to SRS set 0.1 is determined by one of the mapping methods configured by a base station among cyclic (beam) mapping and sequential (beam) mapping. For example, in the case of cyclic beam mapping, SRS set 0 and SRS set 1 are mapped alternately in TO order. For example, if TO=4, TOs 1,2,3,4 are mapped to SRS sets 0, 1, 0, 1, respectively. On the other hand, sequential beam mapping maps one SRS set to two adjacent TOs, and then another SRS set to the next two adjacent TOs. For example, when TO=8, TOs 1,2,3,4,5,6,7,8 are mapped to SRS sets 0,0, 1,1, 0,0, 1,1, respectively. This mapping method is also applied to PUCCH repetition.

In addition to a SRI field, transmit PMI (TPMI), phase tracking reference signal (PTRS), and transmission power control (TPC) fields can also be indicated for each TRP, so that the existing one field has been expanded to two fields. In addition, by introducing a 2-bit SRS resource set indication field, STRP PUSCH repeat transmission can be performed by selecting a specific one of the two SRS sets, and MTRP PUSCH repeat transmission can be performed by selecting both. That is, if the field is 00, 01, SRS set 0 and SRS set 1 are indicated respectively, and STRP PUSCH transmission corresponding to each SRS set is performed, and if it is 10, (SRS set 0, SRS set 1) is indicated, and MTRP PUSCH transmission is performed in the indicated order of SRS set pairs. That is, set 0 corresponds to the first PUSCH TO. In the case of 11, (SRS set 1, SRS set 0) is indicated, and MTRP PUSCH transmission is performed in the order in which the set pairs are indicated. That is, set 1 corresponds to the first PUSCH TO.

(5) MTRP PUCCH Repeated Transmission Based on a Single PUCCH Resource

A base station activates/configures two spatial relation information in a single PUCCH resource for a UE for MTRP PUCCH transmission based on a single PUCCH resource. In this case, two PC (power control) parameter sets can be activated/configured in the case of FR1. When a UE transmits UL UCI through the corresponding PUCCH resource, each spatial relation info is used to indicate spatial relation info toward TRP 1 and TRP 2, respectively. For example, a UE is indicated Tx beam/PC parameters toward TRP 1 through a value indicated in a first spatial relation info, and the UE performs PUCCH transmission in a TO corresponding to TRP 1 using this information. Similarly, a UE is indicated Tx beam/PC parameters toward TRP 2 through a value indicated in a second spatial relation info, and the UE performs PUCCH transmission in a TO corresponding to TRP 2 using this information.

In addition, for MTRP PUCCH repeat transmission, a configuration method has been improved so that two spatial relation info can be configured in the PUCCH resource. That is, if PC parameters such as PLRS, Alpha, P0, and Closed loop index are set for each spatial relation info, spatial relation RS can be configured. As a result, PC information and spatial relation RS information corresponding to two TRPs can be configured through two spatial relation info, UE transmits UCI (i.e., CSI, HARQ-ACK, scheduling request (SR)) in a PUCCH using the first spatial relation info in TO 1, and transmits the same UCI (i.e., CSI, HARQ-ACK, SR) in a PUCCH using the second spatial relation info in TO 2. In the present disclosure, a PUCCH resource with two spatial relation information set is referred to as an MTRP PUCCH resource, and a PUCCH resource with one spatial relation information set is referred to as a STRP PUCCH resource.

In the methods proposed in this disclosure, using (/mapping) a specific TCI state (or TCI) when receiving data/DCI/UCI for a certain frequency/time/space resource may mean that in the case of DL, a channel is estimated from a DMRS using a QCL type and QCL RS indicated by a corresponding TCI state in the frequency/time/space resource, and data/DCI is received/demodulated with the estimated channel. In the case of UL, it can mean that a DMRS and data/UCI are transmitted/modulated using a Tx beam and/or Tx power indicated by a corresponding TCI state in the frequency/time/space resource.

The UL TCI state includes Tx beam and/or Tx power information of a UE, and may be configured for the UE through other parameters such as spatial relation info instead of a TCI state. A UL TCI state may be directly indicated in UL grant DCI, or may mean spatial relation info of an SRS resource indicated through an SRS resource indicator (SRI) field of UL grant DCI. Alternatively, it may mean an open loop (OL) Tx power control parameter (j: index for open loop parameter Po and alpha (up to 32 parameter value sets per cell), q_d: index of DL RS for path loss (PL) measurement (up to 3 measurements per cell), l: closed loop power control process index (up to 2 processes per cell)) linked to a value indicated via an SRI field of UL grant DCI.

In addition, in Rel-17, not only a DL TCI state but also a UL TCI state can be indicated through DL DCI (e.g., DCI format 1-1 or 1-2), or only a UL TCI state can be indicated without a DL TCI state indication. Therefore, the methods used for UL beam and PC (power control) configuration in existing Rel-15/16 are replaced in R-17 with the UL TCI state indication method. More specifically, in R17, one UL TCI state can be indicated through a TCI field of DL DCI, and the corresponding UL TCI state is applied to all PUSCHs and all PUCCHs after a certain time called beam application time, and can be applied to some or all of the indicated SRS resource sets.

Meanwhile, Rel-18 discusses a method for UEs to simultaneously transmit multiple channels/reference signals (RS) of the same type or multiple channels/RSs of different types. In the case of existing UEs, an operation of transmitting multiple channels/RS at one time is restricted (e.g., it is possible to simultaneously transmit multiple SRS resources of different SRS sets for UL beam measurement, but it is impossible to simultaneously transmit multiple PUSCHs), however in the case of advanced UEs in the future, this restriction will be relaxed and multiple channels or RSs can be transmitted simultaneously using multiple transmission panels, and this transmission method can be referred to as simultaneous transmission across multiple panels (STxMP), and such UEs can also be referred to as STxMP UEs. For example, two PUSCHs corresponding to two UL TBs are scheduled on the same resource, and spatial relation RS 1 and PC parameter set 1 (i.e., UL TCI state 1) and spatial relation RS 2 and PC parameter set 2 (i.e., UL TCI state 2) can be configured for PUSCH 1 and 2 transmission, respectively. In this case, a UE can transmit PUSCH 1 using panel 1 corresponding to UL TCI state 1, and simultaneously transmit PUSCH 2 using panel 2 corresponding to UL TCI state 2.

When a base station schedules a PUSCH through DCI, it can indicate whether the PUSCH will be transmitted as STxMP, single panel, MTRP PUSCH repetition, etc. Of course, a UE must have STxMP capability and the STxMP mode must be enabled in advance through RRC signaling, etc. For this purpose, the existing SRS resource set indication field can be redefined and used, or a new DCI field can be introduced.

For convenience of explanation, this disclosure assumes cooperative transmission/reception between 2 TRPs and applies the proposed method, but it can be expanded to a multi-TRP environment of 3 or more, and can be expanded to a multi-panel environment. Different TRPs can be recognized by a UE as different TCI states, and when a UE receives/transmits data/DCI/UCI using TCI state 1, it means that the UE receives/transmits data/DCI/UCI from/to TRP 1.

In the present disclosure, a transmission occasion (TO) may mean each channel transmitted at a different time when multiple channels are TDMed, or each channel transmitted on a different frequency/RB when FDMed, or each channel transmitted on a different layer/beam/DMRS port when SDMed. One TCI state may be mapped to each TO. When the same channel is repeatedly transmitted, a complete DCI/data/UCI is transmitted to one TO, and a receiving end may receive multiple TOs to increase the reception success rate.

Autonomous Beam Pattern Determination Method for MTRP Repetition

In the case of a UE (hereinafter referred to as AI/ML UE for convenience of explanation) that can predict an optimal transmission beam (Tx beam) at a future time through the introduction of AI/ML, etc., a Tx beam to be used at each transmission opportunity (TO) during UL MTRP repetition transmission can be more effectively determined.

According to the existing standard, a base station indicates two UL TCIs (or, in the same sense, spatial relation info, spatial relation RS, PC (power control) set) (hereinafter, TCI in this disclosure may be interpreted as TCI state) for UL MTRP repetition to a UE. In addition, according to one of cyclic/sequential beam patterns configured by a base station, a UL TCI is mapped to a TO, and a UE performs PUSCH/PUCCH repetition transmission according to this mapping.

In the present disclosure, a UE (e.g., AI/ML UE) does not follow a beam pattern (i.e., a mapping pattern) configured by a conventional base station, and a method is proposed in which a UE freely performs mapping of a UL TCI to a TO using two UL TCIs configured/indicated by a base station. Accordingly, a UL beam that is repeatedly transmitted can be optimized to achieve higher reliability.

Hereinafter, in the present disclosure, beam mapping (or beam pattern or beam mapping pattern) means a method/scheme/form in which each of a plurality of beams (i.e., UL TCI state) (or, Spatial relation info, spatial relation RS, PC set) configured to a UE is mapped/corresponded to each TO of uplink transmission (i.e., PUSCH, PUCCH). In addition, in the present disclosure, a beam may be interpreted equivalently to a TCI state (or simply TCI), and beam mapping (or beam pattern or beam mapping pattern) may also be referred to as TCI mapping (or TCI pattern or TCI mapping pattern).

In addition, in the description of the present disclosure below, a transmission occasion (TO) may mean one repeated transmission among repeated transmissions of uplink transmission. That is, in the present disclosure below, a TO may be interpreted as one repetition (or actual repetition), and multiple TOs may be interpreted as multiple repetitions. In addition, uplink transmissions in multiple TOs or in one TO may be interpreted as multiple repetitions or a single repetition for uplink transmission, respectively. In addition, a TO group may be interpreted as a group of repetitions.

In addition, for convenience of explanation, the present disclosure applies the proposed method assuming cooperative transmission/reception between 2 TRPs, however it can be expanded and applied to a multi-TRP environment of 3 or more, and can also be expanded and applied to a multi-panel environment.

More specifically, for example, if UL TCI 1,2, TO=4 are indicated, and a UE determines that it is better (in terms of UL channel quality) to use TCI 1 in TO 1,2,3, and better to use TCI 2 in TO 4, the UE can perform PUSCH/PUCCH repeated transmission by mapping TCI 1,1,1,2 in TO 1,2,3,4, respectively. Here, since each TRP cannot know which beam mapping pattern a UE used, it is necessary to perform UL reception for all TOs. Since this operation may increase the complexity of a base station, according to the proposed method of the present disclosure, a UE can additionally report a beam mapping pattern it has determined to the base station.

An AI/ML UE can be divided into a fully autonomous UE that can completely freely determine a beam mapping pattern and a partially autonomous UE that can determine under some restrictions/conditions configured by a base station. A fully autonomous UE can arbitrarily determine a beam mapping pattern using the 2 TCIs indicated by a base station, and in an extreme case, it can perform STRP (single-TRP) repetition transmission by applying only one TCI. Alternatively, when the number of TOs configured/indicated by a base station is N (N is a natural number), a UE may perform actual uplink transmission from the first TO to the m-th TO ($1 \le m < N$), and may not perform uplink transmission in the remaining TOs if it determines that the UE has performed repeated transmission on a sufficiently good channel. In the case of such a fully autonomous UE, a UE has a high degree of freedom in beam selection, but each TRP must perform blind decoding (BD) for each TO to determine whether UL transmission has been performed on itself or not, which increases the BD complexity.

In addition, according to the proposed method of the present disclosure, a base station can configure/indicate a UE whether to follow the beam mapping pattern (i.e., either cyclic mapping or sequential mapping) as in the conventional method or whether a UE can determine on its own with freedom. For example, a base station can configure/indicate an autonomous beam mapping pattern other than a cyclic/sequential beam pattern (for example, the higher layer parameter mappingPattern can indicate one of {cyclicMapping, sequentialMapping, autonomousMapping}). As another example, it is possible to configure/indicate whether a UE can determine an autonomous beam mapping pattern (i.e., whether to activate/configure an autonomous beam mapping pattern). In this way, if an autonomous beam mapping pattern is configured/indicated, a UE can perform the proposed operations of the present disclosure. The above-described configuration/indication can be provided to a UE, for example, via RRC signaling, MAC CE or DCI.

Embodiment 1: For a UE (e.g., a partially autonomous UE), a base station may indicate beams (i.e., TCI states) of specific one or more TOs, and a UE may autonomously determine beams of the remaining TOs. For example, a beam of the first TO may be configured to use the first TCI indicated. Alternatively, beams of the first TO and the second TO may be configured to use the first TCI and the second TCI, respectively. In this case, for the remaining TOs for which TCIs are not indicated/configured by a base station, a UE may autonomously determine TCIs (i.e., beam), and accordingly, a beam mapping pattern for all TOs configured/indicated for uplink transmission may be determined.

Alternatively, a base station may configure/indicate a time duration (e.g., slot unit) in which a UE can autonomously determine a beam. For example, a time duration (window) may be configured, and a UE may autonomously determine beams for TOs within (i.e., included in) the time duration. Alternatively, a timer may be configured, and the timer may be started from the first TO, and a UE may autonomously determine beams for TOs that exist after t time. In this case, a UE can autonomously determine TCIs (i.e., beam) for TOs included in a time duration according to a time window or timer configured by a base station, and accordingly, a beam mapping pattern for all TOs configured/indicated for uplink transmission can be determined.

In addition, a UE can determine a beam mapping pattern for TOs (or TOs within a specific time window) whose beams (i.e., TCI) are not directed by a base station in the above manner, and report the determined beam mapping pattern to the base station.

Embodiment 2: For a UE (e.g., a partially autonomous UE), a base station may indicate a specific beam pattern (i.e., a mapping method of TCI states). For example, a base station may indicate a beam pattern (i.e., a mapping method) such that the first TO to the N-th TO are mapped to the first TCI, and the remaining rear TOs are mapped to the second TCI. In this case, a UE may follow the beam pattern (i.e., a mapping method), however may autonomously determine the number of TOs to which each TCI is mapped according to the beam pattern indicated by a base station (i.e., the number of TOs to which the first TCI is mapped and/or the number of TOs to which the second TCI is mapped). In this way, by a UE autonomously determining the number of TOs to which each beam (i.e., a TCI state) is applied, a beam mapping pattern for all TOs configured/indicated for uplink transmission may be determined.

Additionally, a UE may report to a base station the number of TOs to which each TCI determined in the above manner is mapped (i.e., the number of TOs to which the first TCI is mapped and/or the number of TOs to which the second TCI is mapped).

Embodiment 3: For a UE (e.g., partially autonomous UE), a base station can designate MTRP/STRP repetition. In this case, if MTRP repetition is indicated/configured, a UE may not operate with STRP repetition by mapping the configured 2 TCIs to at least one TO, respectively. In addition, a beam mapping pattern may be fixed in advance or configured by a base station according to an application ratio of two beams determined by a UE (e.g., UE AI), thereby reducing the BD complexity of a base station. That is, a beam mapping pattern for all TOs configured/instructed for uplink transmission may be determined according to a mapping ratio of TCI states autonomously determined by a UE. For example, if a ratio of beam 1 and 2 is 1:1, it can be negotiated/defined/configured to use a cyclic beam mapping pattern, and if a ratio of beam 1 and 2 is 2:1, it can be negotiated/defined/configured to use beam 1 to be mapped to the first 2/3 TOs and beam 2 to be mapped to the remaining TOs.

In addition, the maximum repetition number (max repetition #) is configured by a base station for each beam (or TRP or TCI state), and a UE can decide how many repetitions to perform for each TRP and report them to the base station. In this case, when determining a mapping ratio, a UE can determine not to exceed the maximum repetition number for each beam (or TRP or TCI state), and a beam mapping pattern for all TOs configured/indicated for uplink transmission can be determined according to the mapping ratio.

Embodiment 4: For a UE (e.g., a partially autonomous UE), a base station can instruct a specific beam pattern (i.e., a mapping method). Accordingly, when TOs mapped to the first TCI are called TO group 1 and TOs mapped to the second TCI are called TO group 2, a base station can configure/indicate a UE whether to follow a beam pattern (i.e., a mapping method) determination for each TO group or let a UE determine on its own with freedom. Alternatively, a UE may be provided with information on a TO group that applies a beam pattern (i.e., a mapping method) determined by a base station and/or a TO group that does not apply a beam pattern (i.e., a mapping method) determined by a base station. In this case, a UE can determines a TCI state for each TO group based on a configuration/indication on whether to apply a beam pattern (i.e., mapping method) for each TO group (i.e., by autonomously determining a TCI state for a TO group that are not indicated by a base station to apply a beam pattern (i.e., mapping method)), thereby determining a beam mapping pattern for all TOs configured/indicated for uplink transmission.

For example, if a base station indicates a cyclic beam pattern, TO=4, TO group 1 becomes TO 1, 3, and TO group 2 becomes TO 2, 4. If an autonomous beam for TO group 1 is turned OFF/deactivated (i.e., configured/indicated to follow the configured/indicated a beam pattern), a UE must use the first TCI in TO 1, 3. When an autonomous beam is turned ON/activated for TO group 2 (i.e., not configured/indicated to follow the configured/indicated a beam pattern), a UE can use the second TCI in TO 2,4 or use another beam (i.e., autonomously selected/determined by a UE). Here, a base station can additionally restrict/configure candidates for beams available in the TO group that has the autonomous beam turned ON/activated (i.e., TO group 2 in the example above). For example, when the 2nd TCI is a beam toward TRP 2, a base station can limit/determine m beams (m is a natural number) that have a high correlation with the beam of the 2nd TCI or have adjacent beam coverage and indicated/configure them to a UE. Alternatively, a base station and a UE with AI/ML capabilities can find m beams on their own based on the 2nd TCI without such signaling.

Embodiment 5: A base station indicated/configures multiple beam mapping patterns for multiple TOs to a UE, and the UE can determine and apply one of the indicated/configured beam mapping patterns by itself. For example, a base station can configure both sequential beam mapping and cyclic beam mapping, and a UE can determine one of sequential beam mapping and cyclic beam mapping by itself. If a UE determines a beam of each TO by itself, the degree of freedom of the UE can be high (i.e., in the example above, the number of beam patterns that a UE can select becomes 2N when the number of TOs is N), however a base station has a burden of performing BD for each TO, so if Embodiment 5 is used, this burden on the base station can be reduced.

The proposed methods according to the above-described Embodiments 1 to 5 assumes two STxMP panels, two UL TCI states, and two Spatial relation info/RS and PC sets configured for UL MTRP transmission for convenience of explanation, but can be extended and applied to N1 (N1 is a natural number greater than 2), N2 (N2 is a natural number greater than 2), and N3 (N3 is a natural number greater than 2), respectively.

In addition, the proposed methods according to the above-described Embodiments 1 to 5 is described as beam mapping for TOs for convenience of explanation, however can be equally applied to a PC set (i.e., pathloss reference signal (PLRS), P0, alpha, closed loop index) as well as a beam.

In addition, the proposed methods according to the above-described Embodiments 1 to 5 can be applied as one method alone, or two or more proposed methods can be finally applied through association/combination.

In addition, whether or not to apply the proposed operations according to the above-described Embodiments 1 to 5 can be indicated by a base station to a UE through signaling such as RRC/MAC CE (control element)/DCI.

In addition, in the proposed methods according to the above-described Embodiments 1 to 5, the AI output of a UE (e.g., it may correspond to output (16) in FIG. 12, and the output may be derived through a procedure in FIG. 16) may be a beam/TRP selection result for each individual TO (e.g., 0 or 1 when there are 2 TRPs), or may be a pattern for multi-TOs (e.g., N bit sequences for N TOs) considering traffic/interference situations at future points in time, or may be a transmission ratio per TRP (e.g., 0.5:0.5 or 0.6:0.4 or 0.7:0.3, etc.) (considering both coverage and reliability).

In addition, in the proposed methods according to the above-described Embodiments 1 to 5, for input data for AI/ML function (i.e., autonomous beam selection of UE), beam-specific quality information (e.g., RSRP, SINR), UE position, rotation information, speed, etc. (e.g., which may correspond to inference data (12) in FIG. 12) may be used.

Figure 17:
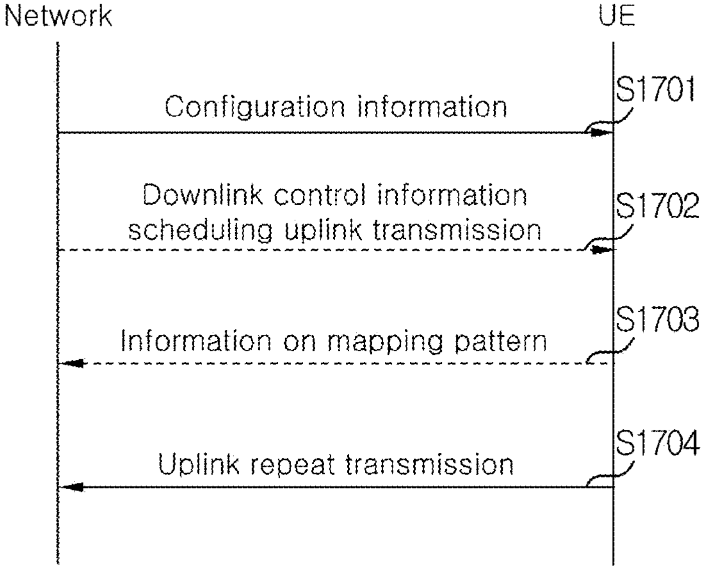
FIG. 17 illustrates a signaling procedure between a network and a UE for an uplink transmission and reception method according to an embodiment of the present disclosure.

FIG. 17 illustrates a signaling procedure between a network and a UE for an uplink transmission and reception method according to an embodiment of the present disclosure.

FIG. 17 illustrates signaling between a network (e.g., TRP 1, TRP 2) and a UE in a situation of multiple TRPs (i.e., M-TRP, or multi-cell, all TRPs hereinafter can be substituted with cells) to which the methods (e.g., Embodiments 1 to 5, a combination of one or more of the proposed methods in Embodiments 1 to 5) proposed in the present disclosure can be applied. Here, a UE/network is only an example and can be substituted with various devices. FIG. 17 is only for convenience of explanation and does not limit the scope of the present disclosure. In addition, some step(s) illustrated in FIG. 17 may be omitted depending on the situation and/or setting.

The signaling method described in FIG. 17 can be extended and applied to signaling between multiple TRPs and multiple UEs. In the following description, a network may be one base station including multiple TRPs, and may be one cell including multiple TRPs. For example, an ideal/non-ideal backhaul may be configured between TRP 1 and TRP 2 that constitute a network. In addition, the following description is based on multiple TRPs, but it can be equally extended and applied to transmission through multiple panels. In addition, in the present disclosure, an operation of a UE receiving a signal from TRP1/TRP2 can also be interpreted/described as (or can be an operation of) an operation of a UE receiving a signal from a network (via/using TRP1/2), and an operation of a UE transmitting a signal to TRP1/TRP2 can also be interpreted/described as (or can be an operation of) an operation of a UE transmitting a signal to a network (via/using TRP1/TRP2), and vice versa.

A base station may be a general term for an object that performs data transmission and reception with a UE. For example, a base station may be a concept including one or more TPs (Transmission Points), one or more TRPs (Transmission and Reception Points), etc. In addition, a TP and/or TRP may include a panel, a transmission and reception unit, etc. of a base station. In addition, "TRP" may be applied by substituting it with expressions such as panel, antenna array, cell (e.g., macro cell/small cell/pico cell, etc.), transmission point, base station (gNB, etc.). As described above, TRPs can be distinguished based on information (e.g., index, ID) about the CORESET group (or CORESET pool). As described above, TRPs can be distinguished based on information (e.g., index, ID) on a CORESET group (or CORESET pool). For example, if one UE is configured to perform transmission and reception with multiple TRPs (or cells), this may mean that multiple CORESET groups (or CORESET pools) are configured for one UE. Such configuration of CORESET groups (or CORESET pools) can be performed via higher layer signaling (e.g., RRC signaling, etc.).

A UE can receive configuration information from a network via/using TRP 1 (and/or TRP 2) (S1701).

The configuration information may include information related to network configuration (e.g., TRP configuration)/information related to M-TRP-based transmission and reception (e.g., resource allocation, etc.). Here, the configuration information may be transmitted through higher layer signaling (e.g., RRC signaling, MAC-CE, etc.).

In addition, for example, the configuration information may include information for configuring a joint TCI and/or separate DL/UL TCI. For example, the configuration information may include a list of TCI states that provide a reference signal for QCL for a DMRS/downlink signal (e.g., CSI-RS) of a downlink channel (e.g., PDSCH, PDCCH), and/or provide a reference for determining an uplink transmission spatial filter of DMRS/uplink signal (e.g., SRS) of an uplink channel (e.g., PUSCH, PUCCH).

The configuration information may include configuration information related to uplink repeat transmission to multiple TRPs described in the proposed methods (e.g., Embodiments 1 to 5, a combination of one or more of the proposed methods in Embodiments 1 to 5) described above. For example, it may include information on an uplink repeat transmission type among several types of repeat operations (e.g., inter-slot repeat transmission type or intra-slot repeat transmission type, etc.), information on the number of repetitions, information for allocating resources used for uplink repeat transmission, etc.

In addition, according to the above-described Embodiment, the configuration information related to the uplink repeat transmission may include information on multiple TCI states for the corresponding uplink repeat transmission. Here, multiple TCI states may be configured/indicated within a list of the above-described TCI states.

Here, in the operation in which a UE autonomously determines TCI states (i.e., beams) mapped to multiple TOs (i.e., multiple repetitions), the UE may determine based on TCI states included within a list of the above-described TCI states, or may determine based on multiple TCI states included within the configuration information related to the above-described uplink repeat transmission.

In addition, the configuration information related to the uplink repetition transmission according to the above-described Embodiment may include information used to determine a mapping pattern between a plurality of TOs for the uplink transmission (i.e., a plurality of repetitions for the uplink transmission) and a plurality of TCI states (i.e., beams).

Here, the configuration information related to the uplink repeat transmission may include information on whether a UE autonomously determines a mapping pattern between multiple TOs and multiple TCI states (i.e., beams) for uplink transmission. In this case, only when the autonomous mapping pattern of a UE is applied/configured, information used to determine the mapping pattern may be included. For example, one of cyclic mapping, sequential mapping, and autonomous mapping may be configured with a higher layer parameter for a mapping pattern for uplink repeat transmission of a UE, and only when autonomous mapping is configured, the configuration information related to the uplink repeat transmission may include information used to determine a mapping pattern.

For example, according to the above Embodiment 1, the information used to determine the mapping pattern may include information on one or more TOs (i.e., one or more repetitions) to which the TCI state configured by a base station is applied among the plurality of TOs (i.e., the plurality of repetitions).

In addition, according to the above Embodiment 2, the information used to determine the mapping pattern may include information on a mapping method of TCI states applied to the plurality of TOs (i.e., multiple repetitions).

In addition, according to the above Embodiment 3, the information used to determine the mapping pattern may include information on a mapping method according to a mapping ratio of TCI states applied to the plurality of TOs (i.e., the plurality of repetitions).

In addition, according to the Embodiment 4, the information used to determine the mapping pattern may include information on a mapping method of TCI states applied to the plurality of TOs (i.e., the plurality of repetitions) and information on whether the mapping method is applied to each TO group (i.e., each repetition group being configured with one or more repetitions) for the plurality of TOs (i.e., the plurality of repetitions). In addition, the information used to determine the mapping pattern may further include information on TCI state candidates for TO groups (i.e., repetition groups) to which the mapping method is not applied.

Additionally, according to the Embodiment 5, the information used to determine the mapping pattern may include information on mapping pattern candidates that can be applied to the plurality of TOs (i.e., the plurality of repetitions).

Meanwhile, although not shown in FIG. 17, a UE may receive a MAC CE (i.e., activation command) from a network to activate and/or deactivate an uplink (or joint) TCI state via/using TRP 1 (and/or TRP 2). This MAC CE may indicate activation and/or deactivation of one or more TCI states (i.e., one or more TCI states in the TCI state list) for an uplink channel/signal, and may also be used to map one TCI state (i.e., a TCI state in the TCI state list) for an uplink channel/signal to a codepoint in a TCI field in DCI.

A UE may receive downlink control information from a network via/using TRP 1 (and/or TRP 2) (S1702).

Here, downlink control information may include frequency/time resource allocation information for uplink repeated transmission, repetition number, information on available TCI states, etc., and may be transmitted via a PDCCH.

In addition, CG Type 1 PUSCH transmission can be configured to operate semi-statically when receiving configuration information (e.g., configuredGrantConfig including rrc-ConfiguredUplinkGrant) for CG configuration without detection of UL grant in DCI. In this case, step S1702 can be omitted.

In addition, CG Type 2 PUSCH transmission can be semi-statically scheduled by UL grant in valid activation DCI after receiving configuration information (e.g., configuredGrantConfig not including rrc-ConfiguredUplinkGrant) for CG configuration. In this case, DCI of step S1702 can correspond to the valid activation DCI.

A UE may determine a mapping pattern between multiple TOs and multiple TCI states (i.e., beams) for uplink transmission, and report/transmit information on a mapping pattern to a network via/using TRP 1 (and/or TRP 2) (S1703).

Here, a UE may not perform an operation of reporting information on a mapping pattern to a network, in which case a network may blindly decode which TCI state (i.e., beam) a UE used/applied for transmission for each TO (i.e., repetition).

For example, according to the above Embodiment 1, when the information used to determine the mapping pattern includes information on one or more TOs (i.e., one or more repetitions) to which the TCI state configured by a base station is applied among the plurality of TOs (i.e., one or more repetitions), the mapping pattern may be determined by determining a TCI state for each of the remaining TOs (i.e., the remaining repetitions) other than the one or more TOs (i.e., one or more repetitions) by a UE.

In addition, according to the above Embodiment 2, when the information used to determine the mapping pattern includes information on a mapping method of TCI states applied to the plurality of TOs (i.e., the plurality of repetitions), the number of TOs (i.e., the number of repetitions) to which each of the TCI states included in the information on the mapping method is applied is determined by the UE, thereby determining the mapping pattern.

In addition, according to the Embodiment 3, when the information used to determine the mapping pattern includes information on a mapping method according to a mapping ratio of TCI states applied to the plurality of TOs (i.e., the plurality of repetitions), the mapping pattern can be determined according to the mapping ratio of TCI states determined by the UE.

In addition, according to the Embodiment 4, when the information used to determine the mapping pattern includes information on a mapping method of TCI states applied to the plurality of TOs (i.e., the plurality of repetitions) and information on whether the mapping method is applied to each TO group (i.e., each repetition group being configured with one or more repetitions) for the plurality of TOs (i.e., the plurality of repetitions), the TCI state is determined based on the information on whether the mapping method is applied to each TO group (i.e., each repetition group) by the UE, thereby determining the mapping pattern. In addition, when the information used to determine the mapping pattern further includes information on TCI state candidates for a TO group (i.e., a repetition group) to which the mapping method is not applied, one of the TCI state candidates may be determined for a TO group (i.e., a repetition group) to which the mapping method is not applied.

In addition, according to the Embodiment 5, when the information used to determine the mapping pattern includes information on mapping pattern candidates that can be applied to the plurality of TOs (i.e., the plurality of repetitions), the mapping pattern can be determined by selecting one of the mapping pattern candidates by the UE.

Here, the operation of determining the mapping pattern can be performed by the UE (or an external device mounted or connected to the UE), and at least one of the functions for the AI/ML operation of FIG. 12 described above (in particular, model inference) to determine the mapping pattern can be performed by the UE (or an external device mounted or connected to the UE). In addition, the UE (or an external device mounted or connected to the UE) can also determine the mapping pattern through the procedure of FIG. 16 described above (in particular, 5. model inference). For example, the UE (or an external device mounted or connected to the UE) can derive the mapping pattern from the AI/ML model (i.e., derive the mapping pattern as an output value) by using at least one of a quality of each reference signal, a position of the UE, a rotation of the UE, and speed of the UE (i.e., use it as an input value).

A UE transmits the uplink transmission repeatedly to a network through/using TRP 1 (and/or TRP 2) in the plurality of TOs based on the plurality of TCI states (S1704).

Here, a UE can transmit the uplink transmission based on a TCI state determined according to the mapping pattern among the plurality of TCI states in each of the plurality of TOs.

Figure 18:
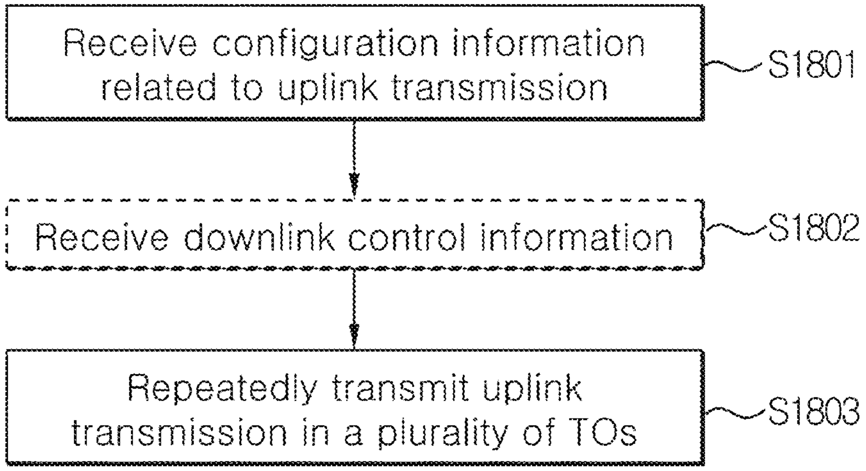
FIG. 18 is a diagram illustrating an operation of a UE for an uplink transmission and reception method according to an embodiment of the present disclosure.

FIG. 18 is a diagram illustrating an operation of a UE for an uplink transmission and reception method according to an embodiment of the present disclosure.

Referring to FIG. 18, FIG. 18 illustrates an operation of a UE based on the proposed methods (e.g., Embodiments 1 to 5, a combination of one or more of the proposed methods in Embodiments 1 to 5). The example of FIG. 18 is for convenience of explanation and does not limit the scope of the present disclosure. Some of the step(s) illustrated in FIG. 18 may be omitted depending on the situation and/or setting. In addition, a UE in FIG. 18 is only an example and may be implemented as a device illustrated in FIG. 20 below. For example, the processor (102/202) of FIG. 20 may control the transceiver (106/206) to transmit and receive channels/signals/data/information, etc., and may also control the processor (102/202) of FIG. 20 to store the channels/signals/data/information to be transmitted or received in the memory (104/204).

Figure 20:
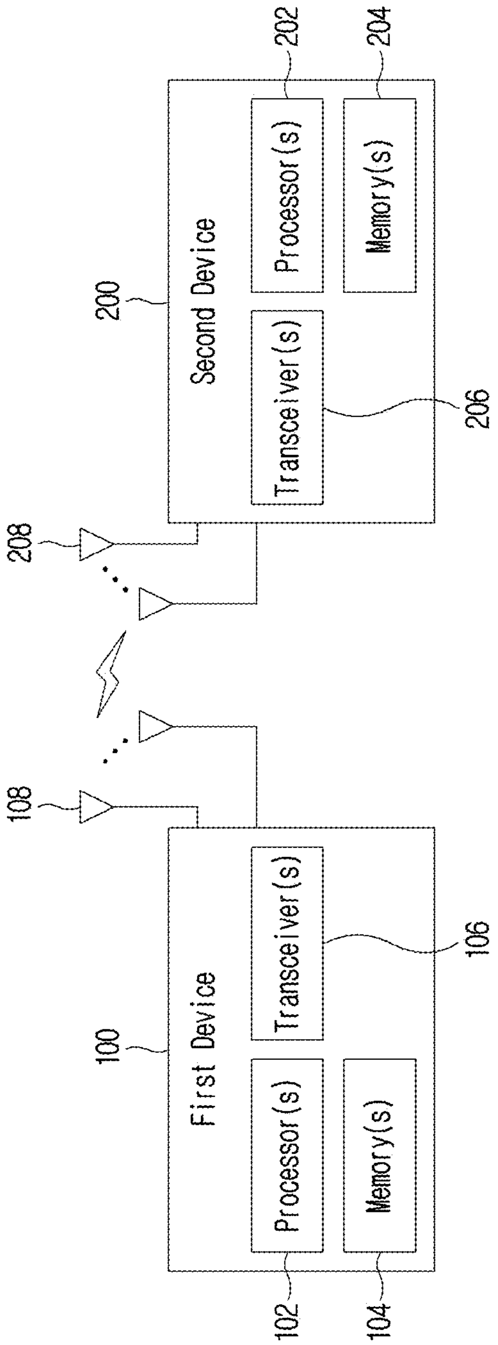
FIG. 20 illustrates a block diagram of a wireless communication device according to an embodiment of the present disclosure.

In addition, an operation of FIG. 18 may be processed by one or more processors (102, 202) of FIG. 20, and an operation of FIG. 18 may be stored in a memory (e.g., one or more memories (104, 204) of FIG. 20) in the form of a command/program (e.g., an instruction, an executable code) for driving at least one processor (e.g., 102, 202) of FIG. 20.

A UE can receive configuration information related to uplink transmission from a base station (via/using TRP 1 (and/or TRP 2)) (S1801).

The configuration information related to uplink transmission may include configuration information related to uplink repeat transmission to multiple TRPs described in the proposed methods (e.g., Embodiments 1 to 5, a combination of one or more of the proposed methods in Embodiments 1 to 5) described above. For example, it may include information on an uplink repeat transmission type among several types of repeat operations (e.g., inter-slot repeat transmission type or intra-slot repeat transmission type, etc.), information on the number of repetitions, information for allocating resources used for uplink repeat transmission, etc.

Additionally, although not shown in FIG. 18, a UE may receive configuration information for configuring a joint TCI and/or separate DL/UL TCI from a base station (via/using TRP 1 (and/or TRP 2)). For example, the configuration information may include a list of TCI states that provide a reference signal for QCL for a DMRS/downlink signal (e.g., CSI-RS) of a downlink channel (e.g., PDSCH, PDCCH), and/or provide a reference for determining an uplink transmission spatial filter of DMRS/uplink signal (e.g., SRS) of an uplink channel (e.g., PUSCH, PUCCH).

In addition, according to the above-described Embodiment, the configuration information related to the uplink transmission may include information on multiple TCI states for the corresponding uplink repeat transmission. Here, multiple TCI states may be configured/indicated within a list of the above-described TCI states.

Here, in the operation in which a UE autonomously determines TCI states (i.e., beams) mapped to multiple TOs (i.e., multiple repetitions), the UE may determine based on TCI states included within a list of the above-described TCI states, or may determine based on multiple TCI states included within the configuration information related to the above-described uplink repeat transmission.

In addition, the configuration information related to the uplink transmission according to the above-described Embodiment may include information used to determine a mapping pattern between a plurality of TOs for the uplink transmission (i.e., a plurality of repetitions for the uplink transmission) and a plurality of TCI states (i.e., beams).

Here, the configuration information related to the uplink repeat transmission may include information on whether a UE autonomously determines a mapping pattern between multiple TOs and multiple TCI states (i.e., beams) for uplink transmission. In this case, only when the autonomous mapping pattern of a UE is applied/configured, information used to determine the mapping pattern may be included. For example, one of cyclic mapping, sequential mapping, and autonomous mapping may be configured with a higher layer parameter for a mapping pattern for uplink repeat transmission of a UE, and only when autonomous mapping is configured, the configuration information related to the uplink repeat transmission may include information used to determine a mapping pattern.

For example, according to the above Embodiment 1, the information used to determine the mapping pattern may include information on one or more TOs (i.e., one or more repetitions) to which the TCI state configured by a base station is applied among the plurality of TOs (i.e., the plurality of repetitions).

In addition, according to the above Embodiment 2, the information used to determine the mapping pattern may include information on a mapping method of TCI states applied to the plurality of TOs (i.e., multiple repetitions).

In addition, according to the above Embodiment 3, the information used to determine the mapping pattern may include information on a mapping method according to a mapping ratio of TCI states applied to the plurality of TOs (i.e., the plurality of repetitions).

In addition, according to the Embodiment 4, the information used to determine the mapping pattern may include information on a mapping method of TCI states applied to the plurality of TOs (i.e., the plurality of repetitions) and information on whether the mapping method is applied to each TO group (i.e., each repetition group being configured with one or more repetitions) for the plurality of TOs (i.e., the plurality of repetitions). In addition, the information used to determine the mapping pattern may further include information on TCI state candidates for TO groups (i.e., repetition groups) to which the mapping method is not applied.

Additionally, according to the Embodiment 5, the information used to determine the mapping pattern may include information on mapping pattern candidates that can be applied to the plurality of TOs (i.e., the plurality of repetitions).

Meanwhile, although not shown in FIG. 18, a UE may receive a MAC CE (i.e., activation command) from a base station to activate and/or deactivate an uplink (or joint) TCI state via/using TRP 1 (and/or TRP 2). This MAC CE may indicate activation and/or deactivation of one or more TCI states (i.e., one or more TCI states in the TCI state list) for an uplink channel/signal, and may also be used to map one TCI state (i.e., a TCI state in the TCI state list) for an uplink channel/signal to a codepoint in a TCI field in DCI.

A UE may receive downlink control information from a base station via/using TRP 1 (and/or TRP 2) (S1802).

Here, downlink control information may include frequency/time resource allocation information for uplink repeated transmission, repetition number, information on available TCI states, etc., and may be transmitted via a PDCCH.

In addition, CG Type 1 PUSCH transmission can be configured to operate semi-statically when receiving configuration information (e.g., configuredGrantConfig including rrc-ConfiguredUplinkGrant) for CG configuration without detection of UL grant in DCI. In this case, step S1802 can be omitted.

In addition, CG Type 2 PUSCH transmission can be semi-statically scheduled by UL grant in valid activation DCI after receiving configuration information (e.g., configuredGrantConfig not including rrc-ConfiguredUplinkGrant) for CG configuration. In this case, DCI of step S1802 can correspond to the valid activation DCI.

A UE determines a mapping pattern between multiple TOs and multiple TCI states (i.e., beams) for uplink transmission, and repeatedly transmits the uplink transmission to a base station through/using TRP 1 (and/or TRP 2) in the plurality of TOs based on the plurality of TCI states (S1803).

Here, a UE can determine a mapping pattern between a plurality of TOs and a plurality of TCI states (i.e., beams) for uplink transmission, and the UE can transmit the uplink transmission based on a TCI state determined according to the mapping pattern among the plurality of TCI states in each of the plurality of TOs.

For example, according to the above Embodiment 1, when the information used to determine the mapping pattern includes information on one or more TOs (i.e., one or more repetitions) to which the TCI state configured by a base station is applied among the plurality of TOs (i.e., one or more repetitions), the mapping pattern may be determined by determining a TCI state for each of the remaining TOs (i.e., the remaining repetitions) other than the one or more TOs (i.e., one or more repetitions) by a UE.

In addition, according to the above Embodiment 2, when the information used to determine the mapping pattern includes information on a mapping method of TCI states applied to the plurality of TOs (i.e., the plurality of repetitions), the number of TOs (i.e., the number of repetitions) to which each of the TCI states included in the information on the mapping method is applied is determined by the UE, thereby determining the mapping pattern.

In addition, according to the Embodiment 3, when the information used to determine the mapping pattern includes information on a mapping method according to a mapping ratio of TCI states applied to the plurality of TOs (i.e., the plurality of repetitions), the mapping pattern can be determined according to the mapping ratio of TCI states determined by the UE.

In addition, according to the Embodiment 4, when the information used to determine the mapping pattern includes information on a mapping method of TCI states applied to the plurality of TOs (i.e., the plurality of repetitions) and information on whether the mapping method is applied to each TO group (i.e., each repetition group being configured with one or more repetitions) for the plurality of TOs (i.e., the plurality of repetitions), the TCI state is determined based on the information on whether the mapping method is applied to each TO group (i.e., each repetition group) by the UE, thereby determining the mapping pattern. In addition, when the information used to determine the mapping pattern further includes information on TCI state candidates for a TO group (i.e., a repetition group) to which the mapping method is not applied, one of the TCI state candidates may be determined for a TO group (i.e., a repetition group) to which the mapping method is not applied.

In addition, according to the Embodiment 5, when the information used to determine the mapping pattern includes information on mapping pattern candidates that can be applied to the plurality of TOs (i.e., the plurality of repetitions), the mapping pattern can be determined by selecting one of the mapping pattern candidates by the UE.

Here, the operation of determining the mapping pattern can be performed by the UE (or an external device mounted or connected to the UE), and at least one of the functions for the AI/ML operation of FIG. 12 described above (in particular, model inference) to determine the mapping pattern can be performed by the UE (or an external device mounted or connected to the UE). In addition, the UE (or an external device mounted or connected to the UE) can also determine the mapping pattern through the procedure of FIG. 16 described above (in particular, 5. model inference). For example, the UE (or an external device mounted or connected to the UE) can derive the mapping pattern from the AI/ML model (i.e., derive the mapping pattern as an output value) by using at least one of a quality of each reference signal, a position of the UE, a rotation of the UE, and speed of the UE (i.e., use it as an input value).

Meanwhile, although not shown in FIG. 18, a UE may report/transmit information on a mapping pattern to a base station via/using TRP 1 (and/or TRP 2). Here, a UE may not perform an operation of reporting information on a mapping pattern to a base station, in which case the base station may blindly decode which TCI state (i.e., beam) the UE used/applied for transmission for each TO (i.e., repetition).

Figure 19:
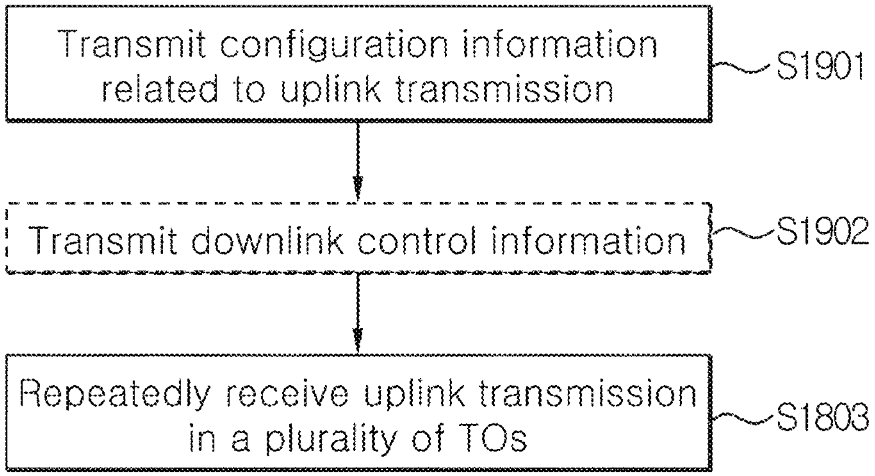
FIG. 19 is a diagram illustrating an operation of a base station for an uplink transmission and reception method according to an embodiment of the present disclosure.

FIG. 19 is a diagram illustrating an operation of a base station for an uplink transmission and reception method according to an embodiment of the present disclosure.

Referring to FIG. 19, FIG. 19 illustrates an operation of a base station based on the proposed methods (e.g., Embodiments 1 to 5, a combination of one or more of the proposed methods in Embodiments 1 to 5). The example of FIG. 19 is for convenience of explanation and does not limit the scope of the present disclosure. Some of the step(s) illustrated in FIG. 19 may be omitted depending on the situation and/or setting. In addition, a base station in FIG. 19 is only an example and may be implemented as a device illustrated in FIG. 20 below. For example, the processor (102/202) of FIG. 20 may control the transceiver (106/206) to transmit and receive channels/signals/data/information, etc., and may also control the processor (102/202) of FIG. 20 to store the channels/signals/data/information to be transmitted or received in the memory (104/204).

In addition, an operation of FIG. 19 may be processed by one or more processors (102, 202) of FIG. 20, and an operation of FIG. 19 may be stored in a memory (e.g., one or more memories (104, 204) of FIG. 20) in the form of a command/program (e.g., an instruction, an executable code) for driving at least one processor (e.g., 102, 202) of FIG. 20.

A base station transmits configuration information related to uplink transmission to a UE (via/using TRP 1 (and/or TRP 2)) (S1901).

The configuration information related to uplink transmission may include configuration information related to uplink repeat transmission to multiple TRPs described in the proposed methods (e.g., Embodiments 1 to 5, a combination of one or more of the proposed methods in Embodiments 1 to 5) described above. For example, it may include information on an uplink repeat transmission type among several types of repeat operations (e.g., inter-slot repeat transmission type or intra-slot repeat transmission type, etc.), information on the number of repetitions, information for allocating resources used for uplink repeat transmission, etc.

Additionally, although not shown in FIG. 19, a base station may transmit configuration information for configuring a joint TCI and/or separate DL/UL TCI to a UE (via/using TRP 1 (and/or TRP 2)). For example, the configuration information may include a list of TCI states that provide a reference signal for QCL for a DMRS/downlink signal (e.g., CSI-RS) of a downlink channel (e.g., PDSCH, PDCCH), and/or provide a reference for determining an uplink transmission spatial filter of DMRS/uplink signal (e.g., SRS) of an uplink channel (e.g., PUSCH, PUCCH).

In addition, according to the above-described Embodiment, the configuration information related to the uplink transmission may include information on multiple TCI states for the corresponding uplink repeat transmission. Here, multiple TCI states may be configured/indicated within a list of the above-described TCI states.

Here, in the operation in which a UE autonomously determines TCI states (i.e., beams) mapped to multiple TOs (i.e., multiple repetitions), the UE may determine based on TCI states included within a list of the above-described TCI states, or may determine based on multiple TCI states included within the configuration information related to the above-described uplink repeat transmission.

In addition, the configuration information related to the uplink transmission according to the above-described Embodiment may include information used to determine a mapping pattern between a plurality of TOs for the uplink transmission (i.e., a plurality of repetitions for the uplink transmission) and a plurality of TCI states (i.e., beams).

Here, the configuration information related to the uplink repeat transmission may include information on whether a UE autonomously determines a mapping pattern between multiple TOs and multiple TCI states (i.e., beams) for uplink transmission. In this case, only when the autonomous mapping pattern of a UE is applied/configured, information used to determine the mapping pattern may be included. For example, one of cyclic mapping, sequential mapping, and autonomous mapping may be configured with a higher layer parameter for a mapping pattern for uplink repeat transmission of a UE, and only when autonomous mapping is configured, the configuration information related to the uplink repeat transmission may include information used to determine a mapping pattern.

For example, according to the above Embodiment 1, the information used to determine the mapping pattern may include information on one or more TOs (i.e., one or more repetitions) to which the TCI state configured by a base station is applied among the plurality of TOs (i.e., the plurality of repetitions).

In addition, according to the above Embodiment 2, the information used to determine the mapping pattern may include information on a mapping method of TCI states applied to the plurality of TOs (i.e., multiple repetitions).

In addition, according to the above Embodiment 3, the information used to determine the mapping pattern may include information on a mapping method according to a mapping ratio of TCI states applied to the plurality of TOs (i.e., the plurality of repetitions).

In addition, according to the Embodiment 4, the information used to determine the mapping pattern may include information on a mapping method of TCI states applied to the plurality of TOs (i.e., the plurality of repetitions) and information on whether the mapping method is applied to each TO group (i.e., each repetition group being configured with one or more repetitions) for the plurality of TOs (i.e., the plurality of repetitions). In addition, the information used to determine the mapping pattern may further include information on TCI state candidates for TO groups (i.e., repetition groups) to which the mapping method is not applied.

Additionally, according to the Embodiment 5, the information used to determine the mapping pattern may include information on mapping pattern candidates that can be applied to the plurality of TOs (i.e., the plurality of repetitions).

Meanwhile, although not shown in FIG. 19, a base station may transmit a MAC CE (i.e., activation command) to a UE to activate and/or deactivate an uplink (or joint) TCI state via/using TRP 1 (and/or TRP 2). This MAC CE may indicate activation and/or deactivation of one or more TCI states (i.e., one or more TCI states in the TCI state list) for an uplink channel/signal, and may also be used to map one TCI state (i.e., a TCI state in the TCI state list) for an uplink channel/signal to a codepoint in a TCI field in DCI.

A base station can transmit downlink control information to a UE via/using TRP 1 (and/or TRP 2) (S1902).

Here, downlink control information may include frequency/time resource allocation information for uplink repeated transmission, repetition number, information on available TCI states, etc., and may be transmitted via a PDCCH.

In addition, CG Type 1 PUSCH transmission can be configured to operate semi-statically when receiving configuration information (e.g., configuredGrantConfig including rrc-ConfiguredUplinkGrant) for CG configuration without detection of UL grant in DCI. In this case, step S1902 can be omitted.

In addition, CG Type 2 PUSCH transmission can be semi-statically scheduled by UL grant in valid activation DCI after receiving configuration information (e.g., configuredGrantConfig not including rrc-ConfiguredUplinkGrant) for CG configuration. In this case, DCI of step S1902 can correspond to the valid activation DCI.

A base station repeatedly receives the uplink transmission from a UE through/using TRP 1 (and/or TRP 2) at the plurality of TOs (based on the plurality of TCI states) (S1903).

Here, a mapping pattern between a plurality of TOs and a plurality of TCI states (i.e., beams) for uplink transmission may be determined by a UE. Then, the uplink transmission may be transmitted by a UE based on a TCI state determined according to the mapping pattern among the plurality of TCI states in each of the plurality of TOs.

For example, according to the above Embodiment 1, when the information used to determine the mapping pattern includes information on one or more TOs (i.e., one or more repetitions) to which the TCI state configured by a base station is applied among the plurality of TOs (i.e., one or more repetitions), the mapping pattern may be determined by determining a TCI state for each of the remaining TOs (i.e., the remaining repetitions) other than the one or more TOs (i.e., one or more repetitions) by a UE.

In addition, according to the above Embodiment 2, when the information used to determine the mapping pattern includes information on a mapping method of TCI states applied to the plurality of TOs (i.e., the plurality of repetitions), the number of TOs (i.e., the number of repetitions) to which each of the TCI states included in the information on the mapping method is applied is determined by the UE, thereby determining the mapping pattern.

In addition, according to the Embodiment 3, when the information used to determine the mapping pattern includes information on a mapping method according to a mapping ratio of TCI states applied to the plurality of TOs (i.e., the plurality of repetitions), the mapping pattern can be determined according to the mapping ratio of TCI states determined by the UE.

In addition, according to the Embodiment 4, when the information used to determine the mapping pattern includes information on a mapping method of TCI states applied to the plurality of TOs (i.e., the plurality of repetitions) and information on whether the mapping method is applied to each TO group (i.e., each repetition group being configured with one or more repetitions) for the plurality of TOs (i.e., the plurality of repetitions), the TCI state is determined based on the information on whether the mapping method is applied to each TO group (i.e., each repetition group) by the UE, thereby determining the mapping pattern. In addition, when the information used to determine the mapping pattern further includes information on TCI state candidates for a TO group (i.e., a repetition group) to which the mapping method is not applied, one of the TCI state candidates may be determined for a TO group (i.e., a repetition group) to which the mapping method is not applied.

In addition, according to the Embodiment 5, when the information used to determine the mapping pattern includes information on mapping pattern candidates that can be applied to the plurality of TOs (i.e., the plurality of repetitions), the mapping pattern can be determined by selecting one of the mapping pattern candidates by the UE.

Meanwhile, although not shown in FIG. 19, a base station may receive information on a mapping pattern from a UE via/using TRP 1 (and/or TRP 2). In this case, a base station may receive the uplink transmission based on a TCI state determined according to the mapping pattern among the plurality of TCI states in each of the plurality of TOs according to the information on the mapping pattern received from a UE.

Here, information on a mapping pattern may not be received from a UE, in which case a base station may blindly decode which TCI state (i.e., beam) the UE used/applied for transmission for each TO (i.e., repetition).

General Device to which the Present Disclosure May be Applied

FIG. 20 is a diagram which illustrates a block diagram of a wireless communication device according to an embodiment of the present disclosure.

In reference to FIG. 20, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs(Application Specific Integrated Circuit), one or more DSPs(Digital Signal Processor), one or more DSPDs(Digital Signal Processing Device), one or more PLDs(Programmable Logic Device) or one or more FPGAs(Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN(Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL(non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN(personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method performed by a user equipment (UE) in a wireless communication system, the method comprising:

receiving, from a base station, configuration information related to uplink transmission, wherein the configuration information includes mapping-related information used to determine a mapping pattern between a plurality of transmission occasions (TOs) for the uplink transmission and a plurality of transmission configuration indication (TCI) states;

reporting, to the base station, information on the mapping pattern; and repeatedly transmitting, to the base station, the uplink transmission in the plurality of TOs based on the plurality of TCI states, wherein the mapping-related information includes information on one or more TOs among the plurality of TOs to which a TCI state configured by the base station is applied, wherein the mapping pattern is determined based on assigning TCI states to remaining TOs by the UE, and wherein the uplink transmission in each of the plurality of TOs is transmitted based on a TCI state determined according to the mapping pattern among the plurality of TCI states.

2. The method of claim 1, wherein based on an autonomous mapping pattern configured by the UE other than cyclic mapping and sequential mapping by the configuration information, the mapping pattern is determined by the UE.

3. The method of claim 1, wherein the mapping-related information includes information on a mapping method of TCI states applied to the plurality of TOs, and wherein the mapping pattern is determined by determining the number of TOs to which each of TCI states included in information on the mapping method is applied by the UE.

4. The method of claim 1, wherein the mapping-related information includes information on a mapping method according to a mapping ratio of TCI states applied to the plurality of TOs, and wherein the mapping pattern is determined according to the mapping ratio of TCI states determined by the UE.

5. The method of claim 1, wherein the mapping-related information includes information on a mapping method of TCI states applied to the plurality of TOs and information on whether the mapping method is applied to each TO group for the plurality of TOs, and wherein the mapping pattern is determined by determining a TCI state based on the information on whether the mapping method is applied to each TO group by the UE.

6. The method of claim 5, wherein the mapping-related information further includes information on TCI state candidates for a TO group to which the mapping method is not applied, and wherein for the TO group to which the mapping method is not applied, one of the TCI state candidates is determined.

7. The method of claim 1, wherein the mapping-related information includes information on mapping pattern candidates applicable to the plurality of TOs, and wherein the mapping pattern is determined by selecting one of the mapping pattern candidates by the UE.

8. The method of claim 1, wherein the mapping pattern is derived from an artificial intelligence/machine learning (AI/ML) model using at least one of a quality of each reference signal, a location of the UE, a rotation of the UE, and a speed of the UE.

9. A user equipment (UE) operating in a wireless communication system, the UE comprising:

at least one transceiver for transmitting and receiving a wireless signal; and at least one processor for controlling the at least one transceiver, wherein the at least one processor configured to:

receive, from a base station, configuration information related to uplink transmission, wherein the configuration information includes mapping-related information used to determine a mapping pattern between a plurality of transmission occasions (TOs) for the uplink transmission and a plurality of transmission configuration indication (TCI) states;

report, to the base station, information on the mapping pattern; and repeatedly transmit, to the base station, the uplink transmission in the plurality of TOs based on the plurality of TCI states, wherein the mapping-related information includes information on one or more TOs among the plurality of TOs to which a TCI state configured by the base station is applied, wherein the mapping pattern is determined based on assigning TCI states to remaining TOs by the UE, and wherein the uplink transmission in each of the plurality of TOs is transmitted based on a TCI state determined according to the mapping pattern among the plurality of TCI states.

10. A base station operating in a wireless communication system, the base station comprising:

at least one transceiver for transmitting and receiving a wireless signal; and at least one processor for controlling the at least one transceiver, wherein the at least one processor configured to:

transmit, to a user equipment (UE), configuration information related to uplink transmission, wherein the configuration information includes mapping-related information used to determine a mapping pattern between a plurality of transmission occasions (TOs) for the uplink transmission and a plurality of transmission configuration indication (TCI) states;

receiving, from the UE, information on the mapping pattern; and repeatedly receive, from the UE, the uplink transmission in the plurality of TOs based on the plurality of TCI states, wherein the mapping-related information includes information on one or more TOs among the plurality of TOs to which a TCI state configured by the base station is applied, wherein the mapping pattern is determined based on assigning TCI states to remaining TOs by the UE, and wherein the uplink transmission in each of the plurality of TOs is transmitted based on a TCI state determined according to the mapping pattern among the plurality of TCI states.

* * * * *